(12) United States Patent
Yamasaki et al.

(10) Patent No.: US 12,225,283 B2
(45) Date of Patent: Feb. 11, 2025

(54) IMAGING APPARATUS AND INFORMATION PRESENTATION SYSTEM

(71) Applicant: Panasonic Intellectual Property Management Co., Ltd., Osaka (JP)

(72) Inventors: Takaaki Yamasaki, Osaka (JP); Shinichi Yamamoto, Osaka (JP); Kyosuke Osuka, Osaka (JP); Yuichi Suzuki, Fukuoka (JP); Akira Seto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/986,729

(22) Filed: Nov. 14, 2022

(65) Prior Publication Data
US 2023/0156321 A1    May 18, 2023

(30) Foreign Application Priority Data

Nov. 18, 2021 (JP) .................................. 2021-188116
Aug. 30, 2022 (JP) .................................. 2022-137165

(51) Int. Cl.
H04N 23/60 (2023.01)
H04N 5/77 (2006.01)
H04N 23/63 (2023.01)

(52) U.S. Cl.
CPC .............. *H04N 23/64* (2023.01); *H04N 5/77* (2013.01); *H04N 23/632* (2023.01); *H04N 23/633* (2023.01)

(58) Field of Classification Search
CPC .............. G06K 9/6201; A61B 6/5241; A61B 1/00045; A61B 1/0002; G06T 2207/30092; G06T 2207/300004; G06T 2207/10068; G06T 2207/10016; G06T 7/0016; G61B 1/041; H04N 23/64; H04N 23/632; H04N 5/772
USPC ....................................... 348/333.11, 348.11
See application file for complete search history.

(56) References Cited

U.S. PATENT DOCUMENTS

| | | | |
|---|---|---|---|
| 2013/0155280 A1* | 6/2013 | Donatelli | H04N 23/635 348/333.02 |
| 2015/0207985 A1* | 7/2015 | Uemura | H04N 23/632 348/333.01 |
| 2021/0168300 A1* | 6/2021 | Wang | H04N 23/698 |

FOREIGN PATENT DOCUMENTS

| | | |
|---|---|---|
| JP | H11-284948 A | 10/1999 |
| JP | 2002-094854 A | 3/2002 |
| JP | 2006-332789 A | 12/2006 |
| JP | 2008-153998 A | 7/2008 |
| JP | 2012-209775 A | 10/2012 |
| JP | 2013-165339 A | 8/2013 |
| JP | 2016-167722 A | 9/2016 |

(Continued)

*Primary Examiner* — Xi Wang
(74) *Attorney, Agent, or Firm* — Renner, Otto, Boisselle & Sklar, LLP

(57) ABSTRACT

An imaging apparatus includes: an image sensor that captures a subject image to generate image data; an output interface that outputs information to a user; and a controller that controls the output interface, based on recording data and the image data generated by the image sensor, the recording data recording information on a first moving image, wherein the controller causes the output interface to output shooting assist information during shooting of a second moving image with the image sensor, the shooting assist information assisting the user to match the second moving image with the first moving image.

14 Claims, 19 Drawing Sheets

(56) References Cited

FOREIGN PATENT DOCUMENTS

| | | | |
|---|---|---|---|
| JP | 2020-191547 | A | 11/2020 |
| JP | 2021-047452 | A | 3/2021 |
| JP | 2022-081342 | A | 5/2022 |
| JP | 2022-103336 | A | 7/2022 |

* cited by examiner

REFERENCE MOVING IMAGE

REPRODUCED MOVING IMAGE

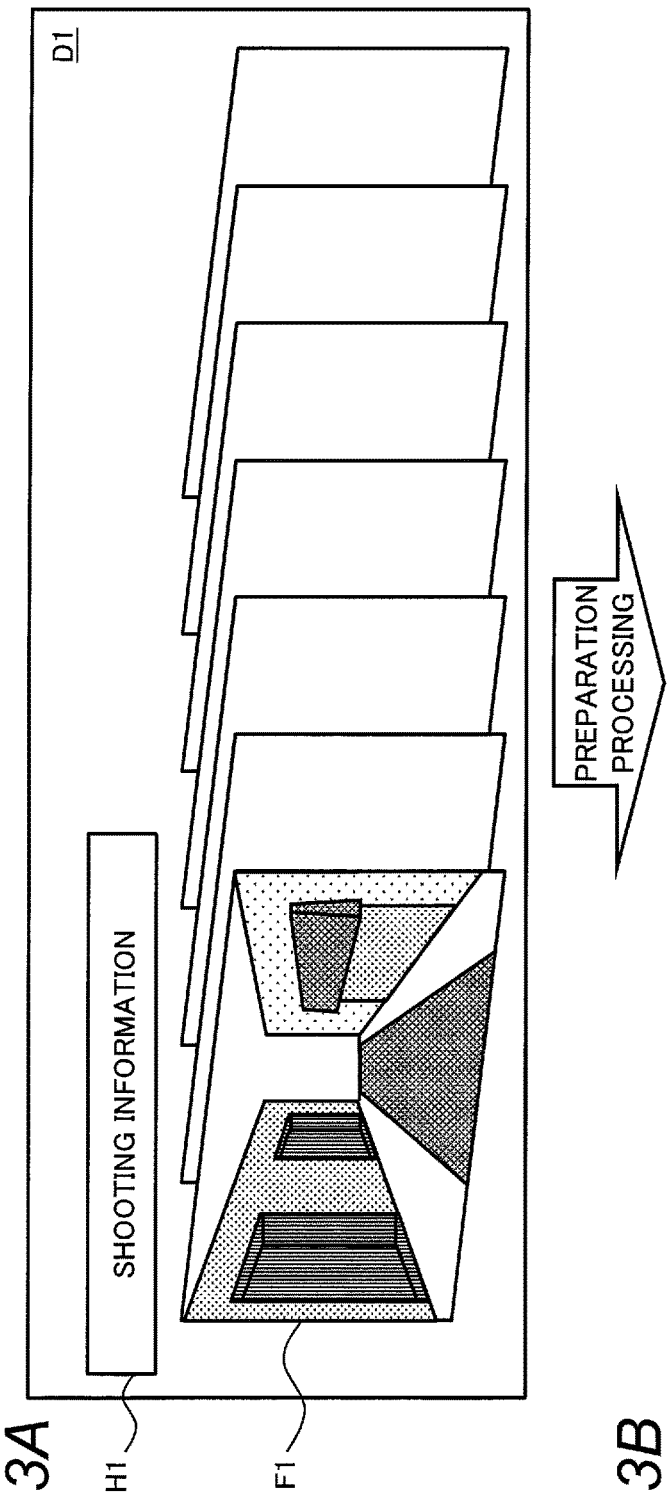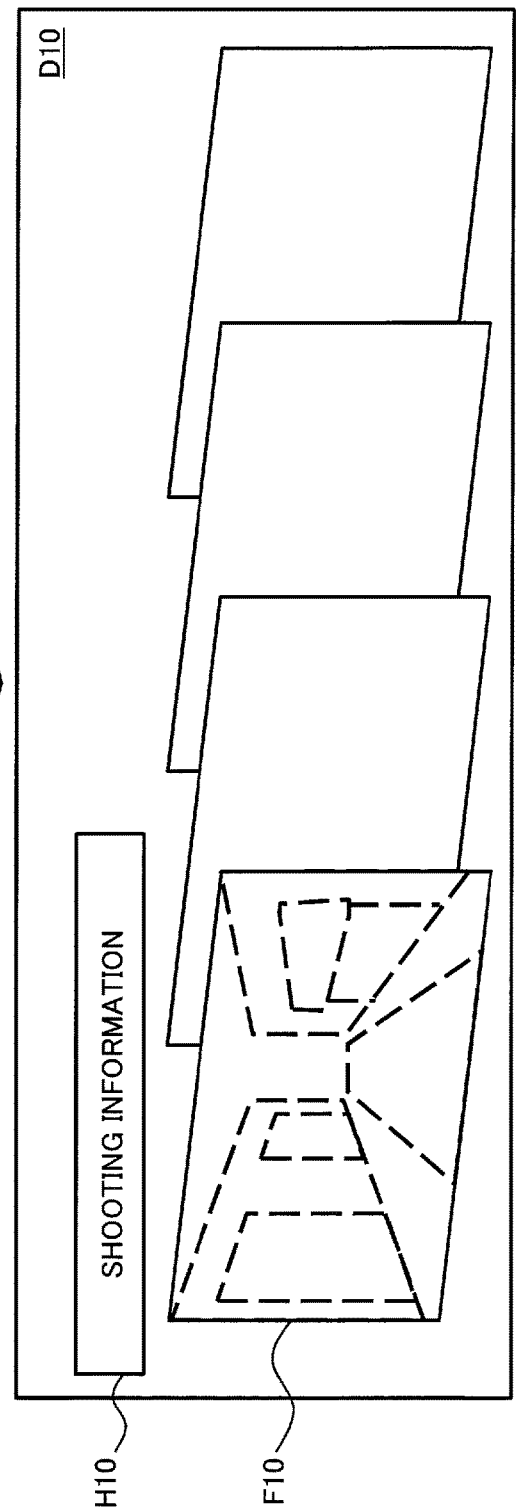
Fig. 3A
Fig. 3B

Fig. 4

| ITEM (SHOOTING STATE) | SETTING RESTORATION | PRE-ANALYSIS | REAL TIME |
|---|---|---|---|
| CAMERA MODEL NUMBER | | | |
| SHOOTING DATE & TIME | | | |
| SHUTTER SPEED | ○ | | |
| STOP | ○ | | |
| ISO | ○ | | |
| SHOOTING MODE (PASM) | ○ | | |
| EXPOSURE CORRECTION VALUE | ○ | | |
| PHOTOMETRIC MODE | ○ | | |
| WHITE BALANCE | ○ | | |
| FOCAL LENGTH | △ | ○ | |
| GYRO INFO. (MOVING DIRECTION, ROTATION SPEED) | | ○ | ○ |
| ACCELERATION INFO. (MOVING DISTANCE, VELOCITY CHANGE) | | ○ | ○ |
| GPS INFO. (LATITUDE, LONGITUDE, ALTITUDE) | | ○ | ○ |
| MOVING IMAGE QUALITY | ○ | | |
| FOCUS MODE (AF/MF) | △ | | |
| AF MODE | ○ | | |
| IMAGE STABILIZATION | ○ | | |
| i DYNAMIC RANGE | ○ | | |
| PERIPHERAL ILLUMINATION CORRECTION | ○ | | |
| FILTER SETTING | ○ | | |
| BRIGHTNESS LEVEL | ○ | | |
| DIFFRACTION CORRECTION | ○ | | |
| AF CUSTOM SETTING | ○ | | |
| MOVING IMAGE SHOOTING RANGE | ○ | | |
| PHOTO STYLE | ○ | | |
| CONTRAST | ○ | | |
| HIGHLIGHT | ○ | | |
| SHADOW | ○ | | |
| CHROMATIC VALUE | ○ | | |
| COLOR HUE | ○ | | |
| COLOR PHASE | ○ | | |
| FILTER EFFECT | ○ | | |
| SHARPNESS | ○ | | |
| NOISE REDUCTION | ○ | | |
| IN-FOCUS POSITION | | ○ | |

*Fig. 18*

| INSTRUCTION LIST ||| D15 |
|---|---|---|
| Reference Time | Action | Instruction Content |
| XX: XX | Product description | Product features: XXXXXXX |
| XX: XX | Plating | After 5 seconds, put the finished dish on the plate. |
| ⋮ | ⋮ | ⋮ |

IMAGING APPARATUS AND INFORMATION PRESENTATION SYSTEM

BACKGROUND

1. Technical Field

The present disclosure relates to an imaging apparatus that shoots a moving image or the like and an information presentation system.

2. Related Art

Conventionally, for still image shooting, in order to reproduce the same composition as a past shooting result, there is known a technique of superimposing and displaying a still image regarding a past shooting result on a through image (e.g., JP 2002-094854 A and JP 2008-153998 A).

JP 2002-094854 A discloses an electronic camera and a fixed point shooting method for easily performing fixed point shooting for performing fixed point shooting for shooting a place previously shot again. The electronic camera of JP 2002-094854 A performs composition processing on a shot image at the time of previous fixed point shooting to obtain a composition image, performs alignment by superimposing the composition image on a through image at the time of current fixed point shooting, and performs fixed point shooting by setting a shooting condition of the previous shot image as a current shooting condition.

JP 2008-153998 A discloses a technique capable of easily selecting a reference image intended by a user from a plurality of images for an electronic camera that combines a reference image and a through image and presents the combined image to the user. The electronic camera of JP 2008-153998 A extracts data of a reference image meeting a predetermined search condition from among data of shot images recorded on a recording medium, and displays a composite image by superimposing a through image generated by an imager at the time of non-release on the reference image.

SUMMARY

The present disclosure provides an imaging apparatus and an information presentation system capable of facilitating to shoot a moving image in which reproduction of an existing moving image is desired.

In the present disclosure, an imaging apparatus includes an image sensor, an output interface, and a controller. The image sensor captures a subject image to generate image data. The output interface outputs information to a user. The controller controls the output interface, based on recording data and the image data generated by the image sensor, the recording data recording information on a first moving image. The controller causes the output interface to output shooting assist information during shooting of the second moving image with the image sensor, the shooting assist information assisting the user to match the second moving image with the first moving image.

In the present disclosure, an information presentation system includes the imaging apparatus described above, and an information presentation device that presents the shooting assist information output from the output interface of the imaging apparatus to the user.

According to the imaging apparatus and the information presentation system in the present disclosure, it is possible to facilitate to shoot a moving image in which reproduction of an existing moving image is desired.

BRIEF DESCRIPTION OF DRAWINGS

FIGS. 3A and 3B are diagrams for explaining a reference moving image and preparation processing in the digital camera;

FIG. 4 is a diagram illustrating shooting information in the digital camera;

FIG. 18 is a diagram illustrating a data structure of an instruction list in the video production system of the fourth embodiment;

DETAILED DESCRIPTION

In the following, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art. It should be noted that the inventor provides the accompanying drawings and the following description for a person skilled in the art to fully understand the present disclosure. Thus, the drawings and the description are not intended to limit the subject matter defined in the claims.

First Embodiment

In the first embodiment, a digital camera as an example of an imaging apparatus according to the present disclosure will be described.

1. Configuration

A configuration of a digital camera according to the first embodiment will be described with reference to FIG. 1.

Figure 1:
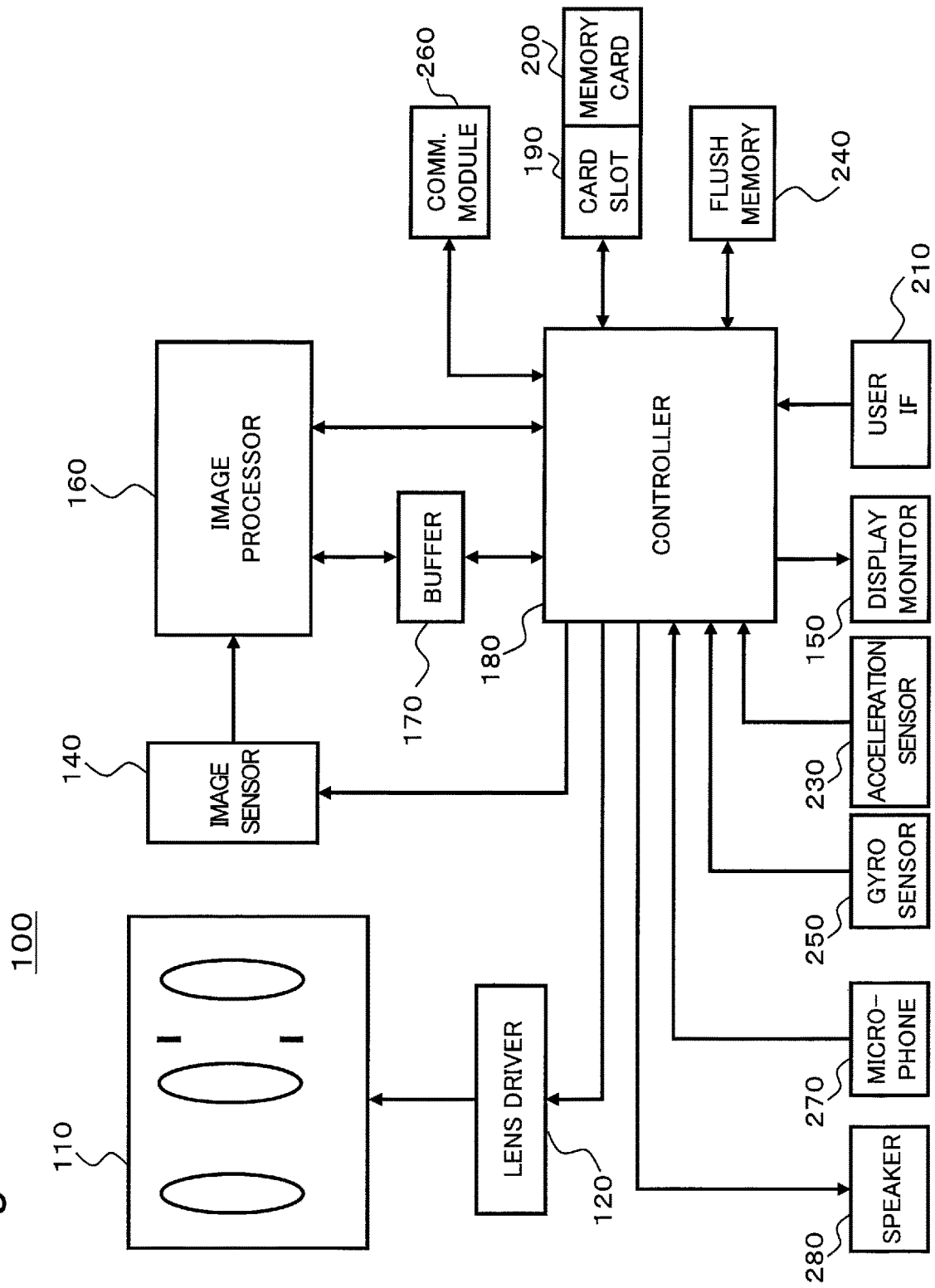
FIG. 1 is a diagram showing a configuration of a digital camera according to a first embodiment of the present disclosure.

FIG. 1 is a diagram showing a configuration of a digital camera 100 according to the present embodiment. The digital camera 100 of the present embodiment includes an optical system 110, a lens driver 120, and an image sensor 140. Further, the digital camera 100 includes an image processor 160, a buffer memory 170, a controller 180, a user interface 210, a display monitor 150, an acceleration sensor 230, and a gyro sensor 250. Furthermore, the digital camera 100 further includes a flash memory 240, a card slot 190, a communication module 260, a microphone 270, and a speaker 280.

The optical system 110 includes a zoom lens, a focus lens, and the like. The zoom lens is a lens for changing the magnification of the subject image formed by the optical system. The focus lens is a lens for changing the focus state of the subject image formed on the image sensor 140. The zoom lens and the focus lens are formed of one or more lenses.

The lens driver 120 includes a configuration for driving various lenses of the optical system 110 such as a focus lens. For example, the lens driver 120 includes a motor, to move the focus lens along the optical axis of the optical system 110 based on the control of the controller 180. The configuration for driving the focus lens in the lens driver 120 can be implemented with a DC motor, a stepping motor, a servo motor, an ultrasonic motor, or the like.

The image sensor 140 captures a subject image incident through the optical system 110 and generates image data. The image data generated by the image sensor 140 is input to the image processor 160.

The image sensor 140 generates image data on a new frame at a predetermined frame rate (e.g., 30 frames/second). The imaging data generation timing and electronic shutter operation in the image sensor 140 are controlled by the controller 180. As the image sensor 140, various image sensors such as a CMOS image sensor, a CCD image sensor, or an NMOS image sensor can be used.

The image sensor 140 executes an imaging operation of a moving image or a still image, an imaging operation of a through image, and the like. The through image is mainly a moving image, and is displayed on the display monitor 150 for the user to determine a composition. The image sensor 140 is an example of an image sensor in the present embodiment.

The image processor 160 performs predetermined processing on the image signal output from the image sensor 140 to generate image data, or performs various processing on the image data to generate an image to be displayed on the display monitor 150. The predetermined processing includes white balance correction, gamma correction, YC conversion processing, electronic zoom processing, compression processing, expansion processing, and the like, but is not limited to these. The image processor 160 may be configured with a hard-wired electronic circuit, or may be configured with a microcomputer, a processor, or the like using a program.

The buffer memory 170 is a recording medium that functions as a work memory for the image processor 160 and the controller 180. The buffer memory 170 is implemented with a dynamic random-access memory (DRAM) or the like. The flash memory 240 is a non-volatile recording medium. Each of the memories 170 and 240 is an example of a memory in the present embodiment.

The controller 180 controls the overall operation of the digital camera 100. The controller 180 uses the buffer memory 170 as a work memory for a control operation or an image processing operation.

The controller 180 includes a CPU or an MPU, and the CPU or MPU achieves a predetermined function by executing a program (software). The controller 180 may include a processor including a dedicated electronic circuit designed to achieve a predetermined function instead of the CPU or the like. That is, the controller 180 can be implemented with various processors such as a CPU, an MPU, a GPU, a DSP, an FPGA, and an ASIC. The controller 180 may include one or more processors.

The card slot 190 can mount the memory card 200, and accesses the memory card 200 based on the control from the controller 180. The digital camera 100 can record image data on the memory card 200 and read the recorded image data from the memory card 200.

The user interface 210 is a generic term for operation members that receive an operation (instruction) from a user. The user interface 210 includes a button, a lever, a dial, a touch panel, a switch, and the like for receiving a user operation, and includes, for example, a moving image recording button, a function button, and the like. Furthermore, the user interface 210 may also include a virtual button or icon displayed on the display monitor 150 or the like.

The display monitor 150 is an example of a display that displays various information (eventually, an example of an output interface). For example, the display monitor 150 displays an image (through image) indicated by image data captured by the image sensor 140 and subjected to image processing by the image processor 160. In addition, the display monitor 150 displays a menu screen or the like for the user to perform various settings on the digital camera 100. The display monitor 150 can be configured by, for example, a liquid crystal display device or an organic EL device.

The acceleration sensor 230 detects one or more accelerations in three axial directions orthogonal to each other, that is, a speed change per unit time, for example. The acceleration sensor 230 outputs acceleration information indicating a detection result to the controller 180. The acceleration sensor 230 is an example of a detector in the present embodiment.

In the digital camera 100, the gyro sensor 250 detects one or more angular velocities of the yaw direction, the pitch direction, and the roll direction, that is, an angular change per unit time, for example. The gyro sensor 250 outputs gyro information indicating a detection result to the controller 180. The gyro sensor 250 is an example of a detector in the present embodiment.

The communication module 260 is a module (circuit) that performs communication conforming to the communication standard IEEE 802.11 or a standard such as Wi-Fi or Bluetooth. The digital camera 100 may communicate directly with other devices via the communication module 260 or may communicate with other devices via an access point. The communication module 260 may be connectable to a communication network such as the Internet. Furthermore, the digital camera 100 may further include a positioning module (an example of a detector) that performs positioning based on information received from a GPS satellite or the like. The communication module 260 is an example of a connecter (eventually, an example of an output interface) that is communicably connected to various external devices.

The microphone 270 is an example of a detector that includes one or more microphone elements built in the digital camera 100 and collects sound outside the digital camera 100, for example. The microphone 270 outputs a sound signal indicating the collected sound to the controller 180. An external microphone may be used in the digital camera 100. The digital camera 100 may include a connecter such as a terminal connected to an external microphone as a detector alternatively or additionally to the built-in microphone 270.

The speaker 280 is an example of an output interface that includes one or more speaker elements built in the digital camera 100, for example. The speaker 280 outputs sound to the outside of the digital camera 100 under the control of the controller 180. For the digital camera 100, an external speaker, an earphone, or the like may be used. The digital camera 100 may include a connecter connected to an external speaker or the like as an output interface alternatively or additionally to the built-in speaker 280.

2. Operation

An operation of the digital camera 100 configured as described above will be described below.

The digital camera 100 of the present embodiment provides a function to assist a shooting person in shooting a moving image so as to reproduce the same manner of shooting as a previously shot moving image (hereinafter, referred to as a "reproduced moving image"), that is, a shooting function of the reproduced moving image.

Figure 2A:
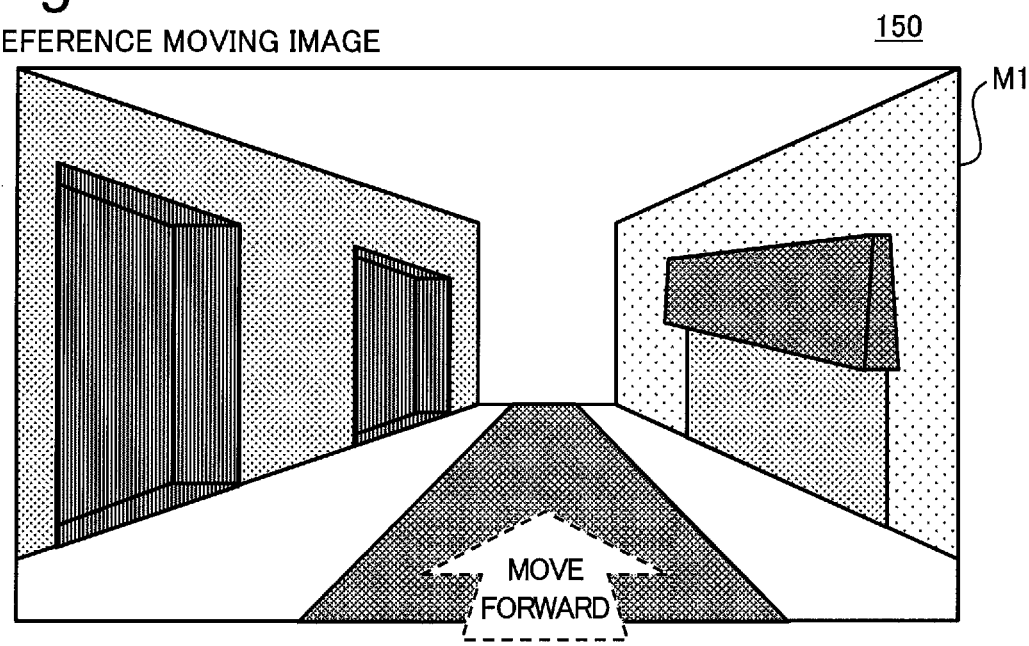
FIGS. 2A and 2B are diagrams for explaining an outline of an operation of the digital camera of the first embodiment.
Figure 2B:
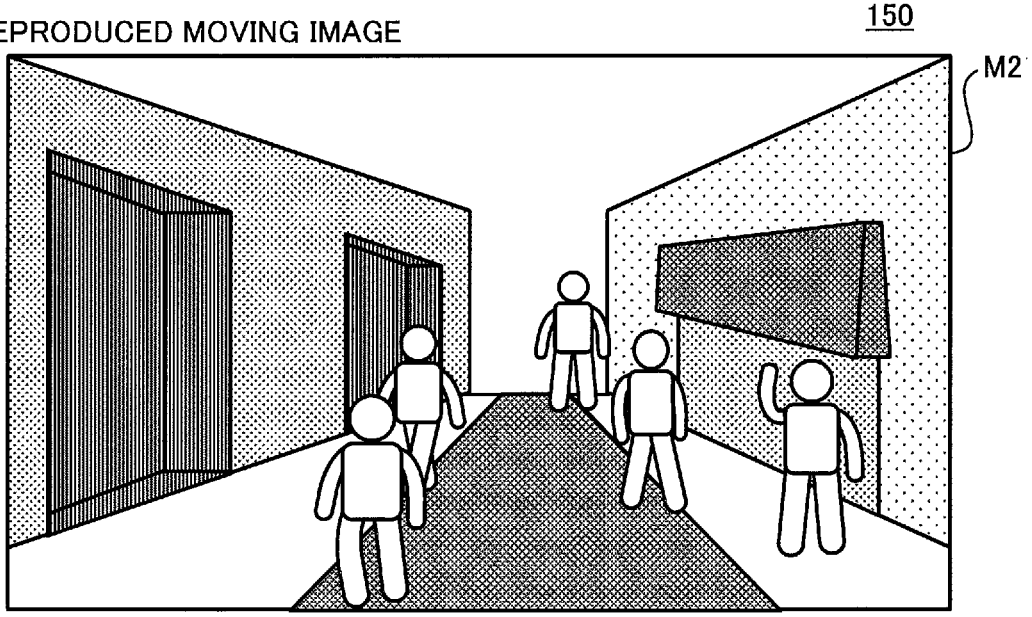

FIGS. 2A and 2B are diagrams for explaining an outline of the operation of the digital camera 100 of the present embodiment. FIG. 2A illustrates a reference moving image M1 in the shooting function of the reproduced moving image. The reference moving image M1 is an existing moving image serving as a reference of reproduction in the shooting function of the reproduced moving image. FIG. 2B illustrates a reproduced moving image M2 with respect to the reference moving image M1 of FIG. 2A. The reference moving image M1 and the reproduced moving image M2 are examples of first and second moving images in the present embodiment, respectively.

The reference moving image M1 of FIG. 2A exemplifies a case where the shooting person shoots an image while moving forward along the street. The reproduced moving image M2 of FIG. 2B illustrates a case where the same street is shot on a date and time when the number of people is larger than that at the time of shooting of FIG. 2A. By comparing the two moving images M1 and M2, it is possible to visualize the change in the state in the same place.

For example, as shown in FIGS. 2A and 2B, the shooting function of the reproduced moving image can be applied to the case of editing the comparison video of the two moving images M1 and M2 shot on moving in the same place on different dates and times. In such a case, even if the shooting person tries to reproduce the moving speed at the time of the second shooting by relying on eye measurement and sense at the time of the first shooting, it can be found difficult to continue moving image shooting with the same angle of view or framing as the previous time.

The application example of the shooting function of the reproduced moving image is not limited to the comparison video as described above, and various applications such as sightseeing guidance, product introduction, or movie production can be cited. For example, for a moving image of product introduction such as e-commerce or live commerce, it is assumed that a scenario such as what kind of camerawork is performed in moving image shooting is determined in advance. For example, even in a case where the shooting person desires to reproduce camerawork that moves around a main subject for shooting an image, it can be found difficult to realize moving image shooting that reproduces the same movement as the previous movement only by relying on the memory and sense of the shooting person.

Therefore, for the shooting function of the reproduced moving image, the digital camera 100 of the present embodiment performs superimposition display in which the reference moving image M1 desired to be reproduced by the shooting person is in turn played back on the live view screen during shooting of the reproduced moving image M2. As a result, the shooting person can check the reference moving image M1 in real time on the shooting of the reproduced moving image M2, and can easily reproduce the same camerawork. For example, in the example of FIGS. 2A and 2B, the accuracy with which the reproduced moving image M2 reproduces the reference moving image M1 can be improved. Thus, the workflow for editing the comparison video can be made efficient.

In addition to the superimposition of the moving images as described above, the digital camera 100 of the present embodiment presents information useful for the shooting person to reproduce the same manner of shooting as the previous moving image during shooting of the reproduced moving image. Hereinafter, details of the operation of the digital camera 100 according to the present embodiment will be described.

2-1. Reference Moving Image and Preparation

An operation of preparing the reference moving image M1 before the shooting of the reproduced moving image M2 is started in the digital camera 100 of the present embodiment will be described with reference to FIGS. 3A to 5.

FIGS. 3A and 3B are diagrams for explaining the reference moving image M1 and preparation processing in the digital camera 100. FIG. 3A illustrates reference moving image data D1 that is moving image data in which the reference moving image M1 is shot. FIG. 3B illustrates reference moving image data D10 subjected to preparation processing described later. Each of the reference moving image data D1 and D10 is an example of recording data of the reference moving image M1 in the present embodiment.

The digital camera 100 of the present embodiment performs shooting and recording of the reference moving image data D1 so as to save various shooting states such as settings and movement states adopted when the shooting person shoots the reference moving image M1, for example. For example, the reference moving image data D1 includes a plurality of frame images F1 and shooting information H1 as shown in FIG. 3A.

The plurality of frame images F1 in the reference moving image data D1 indicate a plurality of frames corresponding to a series of image data sequentially captured as the reference moving image M1. For example, the digital camera 100 generates the reference moving image data D1 by encoding in a predetermined format such as MP4 format at a preset frame rate, and records the reference moving image data D1 in the memory card 200 or the like.

The shooting information H1 manages various shooting states stored when the reference moving image M1 is shot. FIG. 4 illustrates items managed in the shooting information H1. In the present embodiment, the shooting information H1 of the reference moving image M1 is used for the digital camera 100 to automatically restore the setting at the time of shooting the reproduced moving image M2 or for the shooting person to reproduce the moving state.

In the reference moving image data D1, the shooting information H1 is stored as meta information in a header portion of the moving image data, for example. A part or the whole of the shooting information H1 is stored in association with timing information for each frame or the like. For example, a shooting state that changes from moment to moment, such as acceleration information or gyro information, in the reference moving image M1 can be referred to at the time of imaging the reproduced moving image M2.

The digital camera 100 of the present embodiment prepares, from the reference moving image data D1 (FIG. 3A) recorded as described above, the reference moving image data D10 subjected to processing for facilitating superimposition display at the time of shooting the reproduced moving image M2, for example, as shown in FIG. 3B. An example of such processing will be described with reference to FIG. 5.

Figure 5:
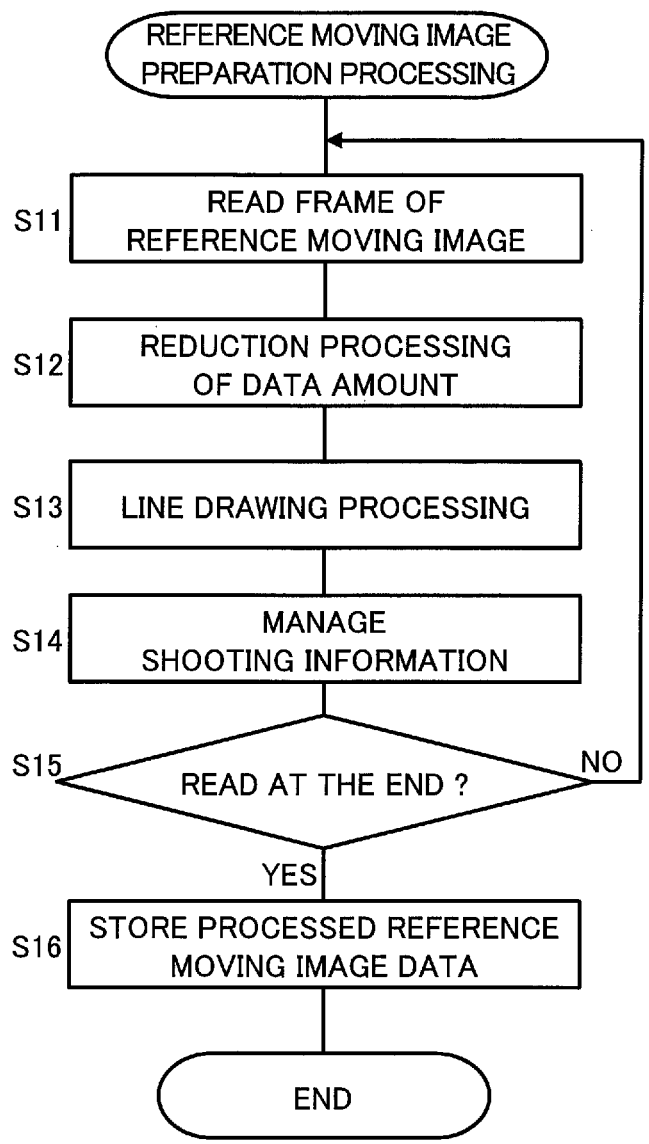
FIG. 5 is a flowchart for explaining reference moving image preparation processing in the digital camera of the first embodiment.

FIG. 5 is a flowchart for describing reference moving image preparation processing in the digital camera 100 of the present embodiment. The processing illustrated in the flowchart of FIG. 5 is started in a state where the reference moving image data D1 (FIG. 3A) shot and recorded is designated by a user operation, for example. For example, each processing of this flow is executed by the controller 180 of the digital camera 100 controlling the image processor 160 and the like.

First, the controller 180 sequentially reads the frame images F1 from the starting end in the reference moving image data D1 (FIG. 3A) stored in the memory card 200, for example, to the buffer memory 170 (S11).

For example, for each frame image F1 to be read, the controller 180 performs processing to reduce the data amount from the reference moving image data D1 as a reading source (S12). For example, the controller 180 reduces the data amount by decreasing the frame rate from the original reference moving image data D1, and performing decimation in units of frames (see FIGS. 3A and 3B). In step S12, the controller 180 may reduce the resolution of the frame image F1 from the original reference moving image data D1 to generate a resized image.

The controller 180 also performs line drawing processing on the read frame image F1, for example (S13). In the line drawing processing (S13), as shown in FIGS. 3A and 3B, an edge is extracted from the frame image F1 in the original reference moving image data D1, to generate a frame image F10 of a line drawing indicating the extracted edge, for example. In the frame image F10 of the line drawing, a portion of the line drawing is indicated with a preset color attribute, and a blank portion having no line drawing is indicated with a transparent color attribute, for example. Note that the processing order of steps S12, S13, and the like is not particularly limited to the illustrated order.

Furthermore, the controller 180 manages shooting information H10 corresponding to the processed frame image F10 in steps S12 and S13, based on the shooting information H1 in the original reference moving image data D1 (S14). For example, the controller 180, referring to the shooting information H1 in the original reference moving image data D1, transfers the shooting state of the item having a circle or the like in the second column "Setting Restoration" of FIG. 4 to the shooting information H10, or analyzes the shooting state of the item having a circle in the third column "Preanalysis".

For example, the controller 180 determines whether or not the frame image F1 at the end in the original reference moving image data D1 has been read (S15). The controller 180 sequentially performs the processing in and after step S11 for each frame image F1 until reaching the end of the reference moving image M1 (NO in S15).

When the processing up to the end of the reference moving image M1 is completed (YES in S15), the controller 180 stores the processed reference moving image data D10 (S16). For example, the controller 180 writes the reference moving image data D1 in association with the original reference moving image data D1 in the memory card 200. The reference moving image data D1 may not be written particularly to the memory card 200 and may be held in the buffer memory 170.

According to the above processing, the processed reference moving image data D10, which is capable of reducing the processing load for displaying playback of the reference moving image M1 at the time of shooting the reproduced moving image M2, can be obtained before shooting the reproduced moving image M2. By the processed reference moving image data D10, the data load spent in the playback processing of the reference moving image M1 in the buffer memory 170 can be reduced, and the data capacity for shooting the reproduced moving image M2 can be easily ensured, for example.

The reference moving image preparation processing (FIG. 5) as described above may be automatically performed after the reference moving image M1 is shot. The processing may be executed in an external device of the digital camera 100, and the processed reference moving image data D10 from the external device may be stored in the digital camera 100 by external input as appropriate.

2-2. Shooting Operation of Reproduced Moving Image

An operation when the digital camera 100 of the present embodiment shoots the reproduced moving image M2 using the reference moving image data D10 prepared in advance as described above will be described with reference to FIGS. 6 to 7.

Figure 6:
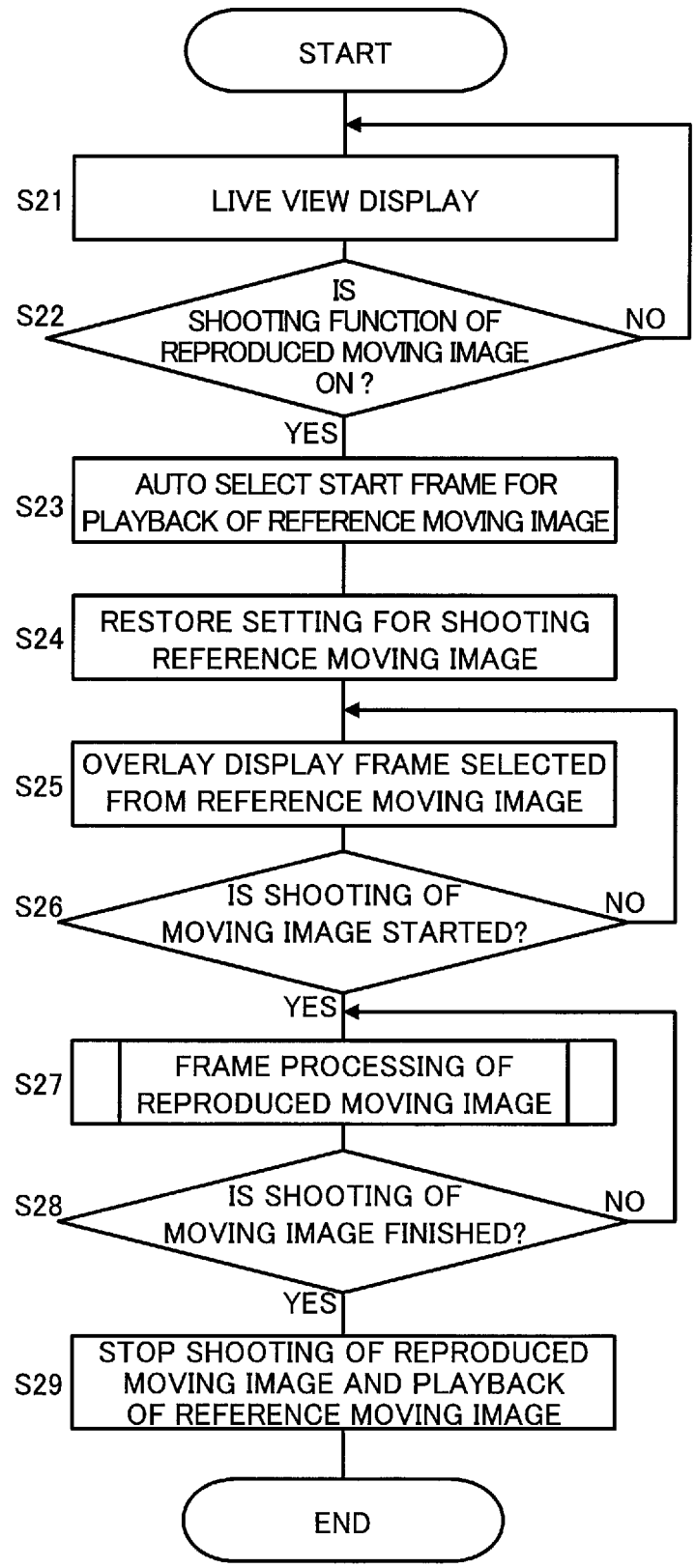
FIG. 6 is a flowchart for explaining a shooting operation of a reproduced moving image in the digital camera.
Figure 7:
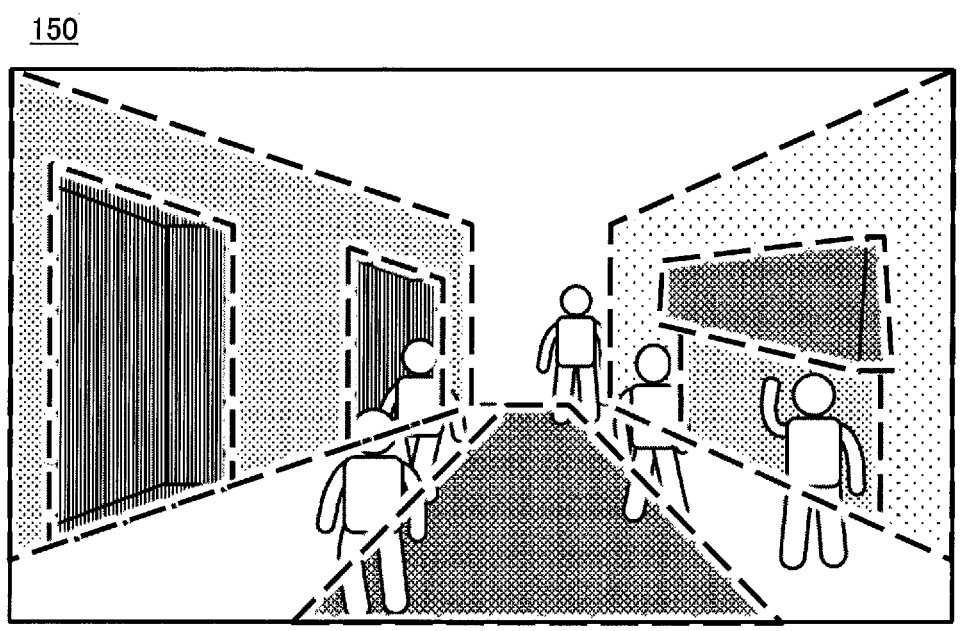
FIG. 7 is a diagram showing a display example of the shooting operation of the reproduced moving image in the digital camera.

FIG. 6 is a flowchart for explaining the shooting operation of the reproduced moving image in the digital camera 100. FIG. 7 illustrates a display example of the shooting operation of the reproduced moving image. For example, each processing shown in the flowchart of FIG. 6 is started, with the reference moving image data D10 desired by the user being stored therein, and is executed by the controller 180 of the digital camera 100.

First, the controller 180 of the digital camera 100 displays a live view screen on the display monitor 150, for example (S21). The live view screen shows in turn through images captured in real time by the image sensor 140 in the digital camera 100.

For example, upon the live view display as described above, the controller 180 determines whether or not a predetermined user operation for turning ON (enabling) the shooting function of the reproduced moving image is input via the user interface 210 of the digital camera 100 (S22). For example, such a target user operation in step S22 is a pressing operation of a function button to which the shooting function of the reproduced moving image is allocated in advance. The ON operation of the function is not particularly limited, and may be a touch operation of a predetermined icon or an operation of a setting menu, for example.

When the ON operation of the shooting function of the reproduced moving image is input (YES in S22), referring to the processed reference moving image data D10 for example, the controller 180 automatically selects a frame image to be used at the start of shooting of the reproduced moving image M2 from a plurality of frame images in the reference moving image M1 (S23). For example, the controller 180 compares the plurality of frame images in the reference moving image M1 with a current captured image such as a through image, detects the similarity of each frame image, and selects a frame image having the highest similarity.

Furthermore, the controller 180 restores various settings of the digital camera 100 to the state at the time of shooting of the reference moving image M1, based on the shooting information H10 in the reference moving image data D10, for example (S24). The various settings of the digital camera 100 that can be restored in step S24 are illustrated in FIG. 4.

In the table of FIG. 4, the items having a circle in the "Setting Restoration" in the second column can be set and restored in step S24. The items having a triangle can also be restored by electronic control instead of manual operation. On the other hand, even if the same column is blank, it is considered that the item having a circle in "Real Time" in the fourth column can be reproduced by the shooting person appropriately performing camerawork. In the present embodiment, information that facilitates such reproduction is also presented (details will be described later).

In the live view screen of the display monitor 150, the controller 180 causes overlay display in which the frame image and the through image selected in step S23 are superimposed to be executed (S25). A display example in step S25 is shown in FIG. 7.

For example, in step S25, the controller 180 causes the image processor 160 to generate a composite image in which the layer of the frame image F10 (FIG. 3B) of the reference moving image M1 is provided on the upper layer of the layer of the through image, with a blank portion in the line drawing being made transparent to transmit the live view image. The overlay display (FIG. 7) in step S25 is performed such that a still image of a selected frame is superimposed on a through image of a moving image, for example. At this time, it can be said that the playback processing of the reference moving image M1 is in a state of being paused at the selected frame.

For example, the controller 180 determines whether or not start of moving image shooting is instructed in the state of the overlay display as described above (S26). For example, the controller 180 detects a user operation such as pressing of a moving image recording button in the user interface 210. When determining that start of moving image shooting is not instructed (NO in S26), the controller 180 returns to step S25, for example.

When start of moving image shooting is instructed (YES in S26), the controller 180 starts playback display of the reference moving image data D1 from the frame image overlaid and displayed on the display monitor 150, to execute processing of shooting the reproduced moving image M2 for each frame (S27). The frame processing (S27) of the reproduced moving image performs, when moving image data indicating the reproduced moving image M2 on shooting is recorded for each frame, information display for making the reproduced moving image M2 easily reproduce the reference moving image M1, for example. Details of the processing in step S27 will be described later.

For example, the controller 180 determines whether or not the end of moving image shooting is instructed when performing the frame processing (S27) of the reproduced moving image as described above every predetermined frame period (S28). For example, the controller 180 detects a user operation such as pressing of a moving image recording button. For example, the predetermined frame period is a period corresponding to the frame rate of the reference moving image data D10.

When the controller 180 determines that the end of moving image shooting is not instructed (NO in S28), the frame processing (S27) of the reproduced moving image is repeated, for example. As a result, on shooting of the reproduced moving image M2, the reference moving image M1 for each frame is sequentially played back in overlay display.

For example, when the end of moving image shooting is instructed (YES in S28), the controller 180 stops the shooting and recording of the moving image data of the reproduced moving image M2 and the playback display of the reference moving image M1 (S29), to end the processing shown in this flow.

According to the shooting operation of the reproduced moving image, the reference moving image M1 desired to be reproduced in the reproduced moving image M2 is displayed as playback to be superimposed on the through image in the shooting of the reproduced moving image M2 (S27). As a result, the shooting person can check how to shoot the reference moving image M1 timely in the shooting of the reproduced moving image M2 and the difference from the reproduced moving image M2 in the shooting. Thus, the shooting person can easily shoot the reproduced moving image M2.

In the above description, an example in which the frame image of the playback start of the reference moving image M1 is selected in step S23 has been described. The frame selection (S23) for starting playback of the reference moving image M1 is not limited to the above example, and GPS information may be used, for example. For example, the controller 180 may compare the GPS information in the shooting information H10 of the reference moving image data D10 with the current GPS information, and extract a frame image closer to the current location as a candidate for the playback start frame. The playback start frame may be a predetermined frame such as the first frame in the reference moving image M1, or may be selected by a user operation. Alternatively, the controller 180 may repeatedly execute the automatic selection of the frame to start playback before the start of moving image shooting (NO in S26).

In step S24 described above, an example has been described in which the setting of the reference moving image M1 is restored before the start of shooting the reproduced moving image M2. In a case where there is a setting changed in the shooting of the reference moving image M1, the digital camera 100 may restore such a setting change of the reference moving image M1. That is, the controller 180 may change the setting similar to the setting change of the reference moving image M1 in the shooting of the reproduced moving image M2.

2-2-1. Frame Processing of Reproduced Moving Image

The frame processing of the reproduced moving image in step S27 of FIG. 6 will be described with reference to FIGS. 8 to 9.

Figure 8:
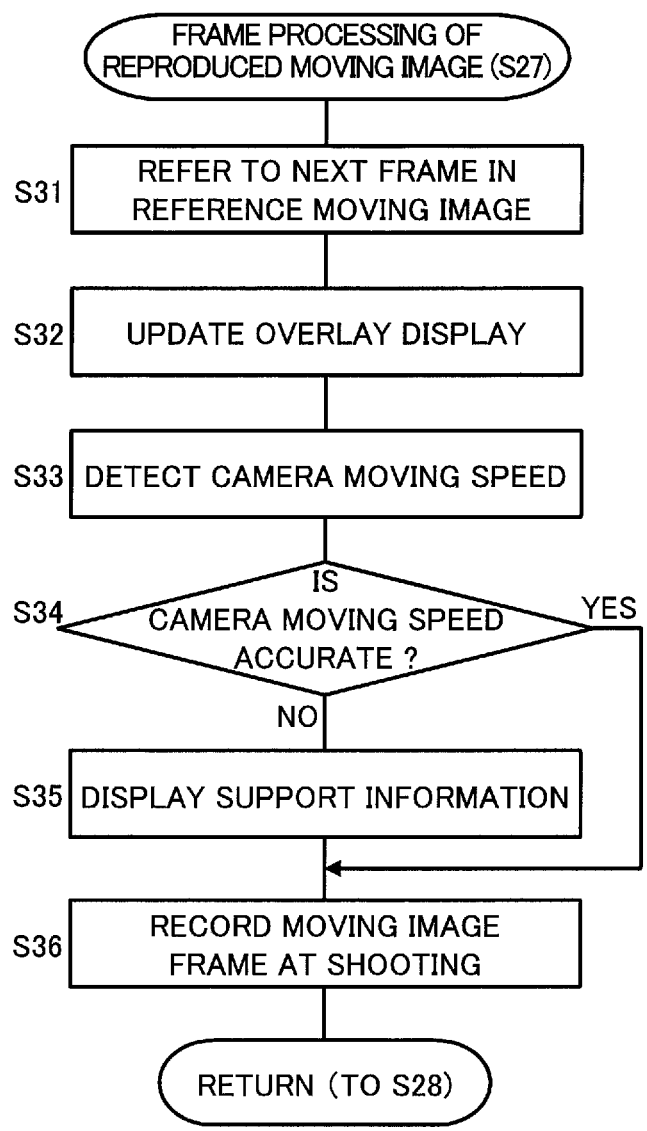
FIG. 8 is a flowchart for explaining frame processing of the reproduced moving image in the digital camera of the first embodiment.

FIG. 8 is a flowchart for explaining frame processing of the reproduced moving image in the digital camera 100 of the present embodiment (S27 of FIG. 6). FIG. 9 is a diagram showing a display example of the support information in the digital camera 100.

First, the controller 180 refers to a frame image next to the displayed frame image in the processed reference moving image data D10, for example (S31). The controller 180 controls the image processor 160 to perform playback processing such as decoding of the frame image in the reference moving image M1. The controller 180 also acquires the shooting information H10 corresponding to such a new frame image.

The controller 180 causes the image processor 160 to generate a composite image in which a new frame image is superimposed on a through image, similarly to step S25 of FIG. 6, to update the overlay display on the display monitor 150 (S32). Thus, the overlay display, in which the reference moving image M1 is sequentially played back in the shooting of the reproduced moving image M2, is an example of shooting assist information in the present embodiment.

Furthermore, in the present embodiment, the controller 180 detects the camera movement speed of the digital camera 100, based on the detection result of the acceleration sensor 230 as an example of the current shooting state (S33). Step S33 is an example of processing for checking the current shooting state in the digital camera 100. The detection of the camera moving speed (S33) is not particularly limited to the detection result of the acceleration sensor 230, and may be performed based on a change in position information such as GPS information or image analysis of a motion vector or the like in a through image, for example.

Based on the detected current camera moving speed and the camera moving speed in the shooting information H10 of the reference moving image data D10, the controller 180 determines whether or not the current camera moving speed is more accurate than the camera moving speed at the corresponding time point in the reference moving image M1 (S34). The determination in step S34 is performed according to whether or not the deviation between the current camera moving speed and the corresponding camera moving speed in the reference moving image data D1 is within a predetermined range indicating an allowable error, for example.

For example, when determining that the current camera moving speed is not accurate (NO in S34), the controller 180 causes the display monitor 150 to display support information (i.e., support information) for resolving the deviation of the current camera moving speed according to the deviation (S35). A display example in step S35 is shown in FIG. 9.

Figure 9:
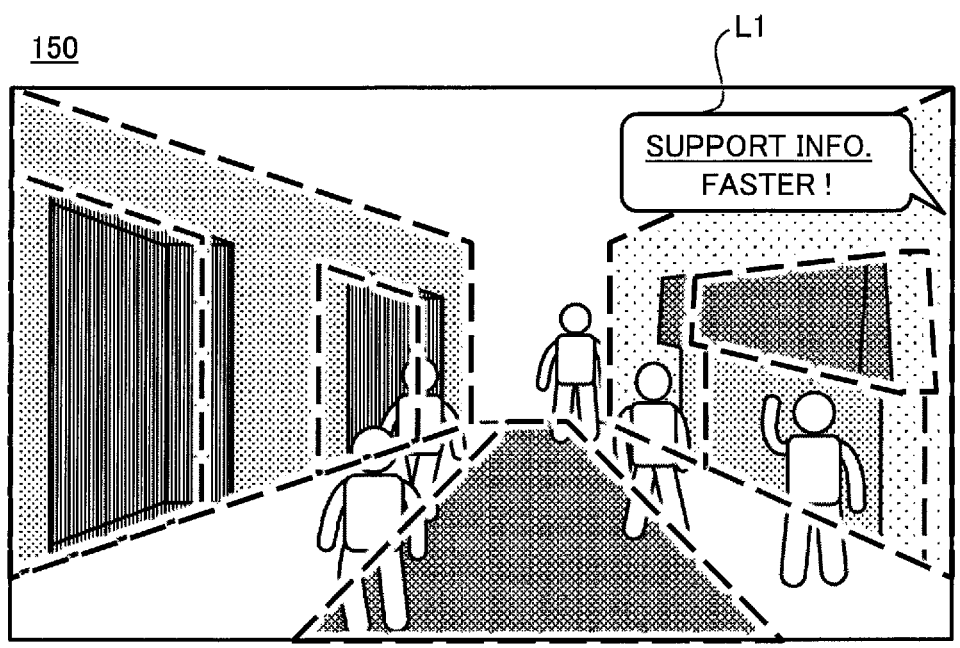
FIG. 9 is a diagram showing a display example of support information in the digital camera of the first embodiment.

FIG. 9 illustrates a case where the current camera moving speed is slower than the corresponding camera moving speed in the reference moving image M1. In this case, the controller 180 causes the display monitor 150 to display support information L1 including contents prompting the shooting person to increase the camera moving speed (S35). On the other hand, when the current camera moving speed is faster than the corresponding camera moving speed of the reference moving image M1, the controller 180 causes the support information L1 to include a content for decreasing the camera moving speed. Such support information L1 is an example of a first notification included in shooting assist information of the present embodiment.

On the other hand, when determining that the current camera moving speed is accurate, for example (YES in S34), the controller 180 proceeds to step S36 without particularly performing the processing of step S35, for example.

The controller 180 sequentially records the moving image data being shot for each frame, based on the image data captured by the image sensor 140 at the same frame rate as the reference moving image M1, for example (S36). The controller 180 records such moving image data of the reproduced moving image M2 in the memory card 200 via the card slot 190, for example.

The controller 180 ends the frame processing of the reproduced moving image (S27 of FIG. 6) by frame recording of the moving image data (S36), to proceed to step S28, for example. Thereafter, in particular, when the end of the moving image shooting is not instructed (NO in S28), the controller 180 performs the processing in and after step S31 again.

According to the frame processing (S27) of the reproduced moving image, in the shooting of the reproduced moving image M2, the reference moving image data D10 is played back for each frame so that the overlay display is updated (S31, S32). As a result, the reproduced moving image M2 can be shot with sequentially visualizing the progress of the reference moving image N1 desired to be reproduced by the shooting person, for example.

In the above example, when the camera moving speed in the shooting of the reproduced moving image M2 deviates from the corresponding camera moving speed in the reference moving image M1 (NO in S34), the support information L1 (FIG. 9) according to the deviation is displayed (S35). The presentation of the support information L1 enables the shooting person to assist in correcting the deviation of the shooting state from the reference moving image M1 when the deviation occurs.

In steps S33 and S34 described above, the camera moving speed is detected as an example of the shooting state to be reproduced by the user such as the shooting person. However, various shooting states may be detected without being limited to the camera moving speed. For example, in order to reproduce the panning shooting state, the digital camera 100 may detect the panning speed by the gyro sensor 250 or the like. Furthermore, in order to reproduce the shooting state of zooming or focusing, for example, the driving amount of the lens driver 120 or the operation amount by manual operation may be detected.

Furthermore, in the above description, an example has been described in which the overlay display (S25, S32) of the reference moving image M1 is performed by line drawing, but the overlay display is not limited to the line diagram. For example, the digital camera 100 may perform overlay display by assigning transmittance to the frame image F1 or the through image. In this case, the image processor 160 may generate the composite image such that the through image is transmitted from the frame image F1 of the reference moving image M1 in the upper layer of the through image, or may use layers in reverse order. Also by such overlay display, it is possible to obtain a transmission state in which both the reference moving image M1 and the reproduced moving image M2 are simultaneously positioned and visualized.

In the above description, the operation in a case where the reference moving image M1 reproduced by the digital camera 100 is designated in advance has been described, but the reference moving image M1 may not be designated. For example, additionally or alternatively to step S23 of FIG. 6, the controller 180 of the digital camera 100 may search the reference moving image M1 from a plurality of moving images by applying a known search technique such as JP 2008-153998 A. Furthermore, the reference moving image preparation processing (FIG. 5) may be performed on each of a plurality of pieces of moving image data that are candidates for the reference moving image M1.

3. Summary

As described above, the digital camera 100 as an example of an imaging apparatus in the present embodiment includes the image sensor 140 as an example of an image sensor, the display monitor 150 as an example of an output interface, and the controller 180. The image sensor 140 captures a subject image and generates image data. The display monitor 150 outputs information to the user by display. The controller 180 controls an output interface such as the display monitor 150, based on the reference moving image data D10 which is an example of recorded data in which information regarding the reference moving image M1 is recorded as an example of first moving image, and the image data generated by the image sensor 140. During shooting of the second moving image by the image sensor 140, the controller 180 causes the display monitor 150 to output various information on the live view screen as an example of shooting assist information for assisting the user so as to match the second moving image with the first moving image.

According to the digital camera 100 described above, it is possible to facilitate moving image shooting in which it is desired to reproduce an existing moving image such as the reference moving image, by various image shooting assist information for assisting the user so as to match the reference moving image M1 with the reproduced moving image M2 on shooting.

In the digital camera 100 of the present embodiment, the controller 180 causes the display monitor 150 to display the shooting assist information to play back the first moving image during the shooting of the second moving image, based on the reference moving image data D10, for example (S27, FIGS. 7 and 9). According to the digital camera 100, it is possible to easily perform moving image shooting in which it is desired to reproduce an existing moving image such as the reference moving image by the shooting assist information such as the playback information in which the reference moving image M1 is played back during shooting of the reproduced moving image M2. The digital camera 100 may include the buffer memory 170 as an example of a memory that holds the reference moving image data D10.

In the digital camera 100 of the present embodiment, the output interface includes at least one of a display such as the display monitor 150 that displays the second moving image, or a connecter (e.g., the communication module 260) communicatively connected to the display. For example, as shown in FIG. 7, the shooting assist information includes overlay display for displaying playback of the reference moving image M1 in a state where the frame image of the reference moving image M1 and the through image of the reproduced moving image M2 are superimposed. According to this, the user such as the shooting person can shoot the moving image easily with comparing the reference moving image M1 to be reproduced with the reproduced moving image M2 on shooting. Thus, the digital camera 100 can easily assist the shooting of the reproduced moving image M2.

In the digital camera 100 of the present embodiment, in the shooting assist information, the playback of the reference moving image M1 is displayed as the frame image F10 of the line drawing so as to be superimposed on the through image of the reproduced moving image M2. According to this, both the feature portion of the reference moving image M1 and the through image of shooting in progress can be easily viewed by the user, and the reproduced moving image M2 can be easily shot.

In the present embodiment, the digital camera 100 further includes various sensors 230, 130 and the like each as an example of a detector that detects a shooting state in which the reproduced moving image M2 is shot. The shooting assist information includes the support information L1 that is an example of a first notification indicating an instruction to reduce a difference between the shooting state of the reference moving image M1 (as an example of a first shooting state) and the shooting state of the reproduced moving image M2 (as an example of a second shooting state), according to the shooting state detected by the detector during playback of the first moving image (see FIG. 9). According to such support information L1, when the shooting state deviates from the reference moving image M1 during the shooting of the reproduced moving image M2, it is possible to assist to resolve the deviation.

In the digital camera 100 of the present embodiment, the controller 180 selects a frame for starting playback display of the reference moving image M1, among a plurality of frames in the reference moving image M1 (S23). According to this, when the user shoots the reproduced moving image M2, playback display of the reference moving image M1 is appropriately started. Thus, the reproduced moving image M2 can be easily shot.

In the digital camera 100 of the present embodiment, the controller 180 sets the digital camera 100 so as to restore the shooting state of the reference moving image M1 (S24), and executes shooting of the reproduced moving image M2 (S25 to S26). According to this, the setting of the shooting state of the reproduced moving image M2 is restored similarly to the reference moving image M1. Thus, the reference moving image M1 can be easily reproduced in the reproduced moving image M2.

In the digital camera 100 of the present embodiment, the reference moving image data D10 as an example of recording data records the shooting state in which the reference moving image M1 is shot and the frame image F1 of the reference moving image M1 in association with each other. According to such recording data, it is possible to easily assist the shooting of the reproduced moving image M2 with reference to the shooting state of the reference moving image M1.

Second Embodiment

Hereinafter, a second embodiment of the present disclosure will be described with reference to FIGS. 10 to 12. In the first embodiment, an example of presenting the support information L1 for resolving the deviation of the reproduced moving image M2 from the reference moving image M1 has been described. In the second embodiment, a digital camera 100 that presents preannouncement information announcing a change in a shooting state of the reference moving image M1 will be described.

Hereinafter, description of the same configuration and operation as those of the digital camera 100 according to the first embodiment will be appropriately omitted, and the digital camera 100 according to the present embodiment will be described.

Figure 10:
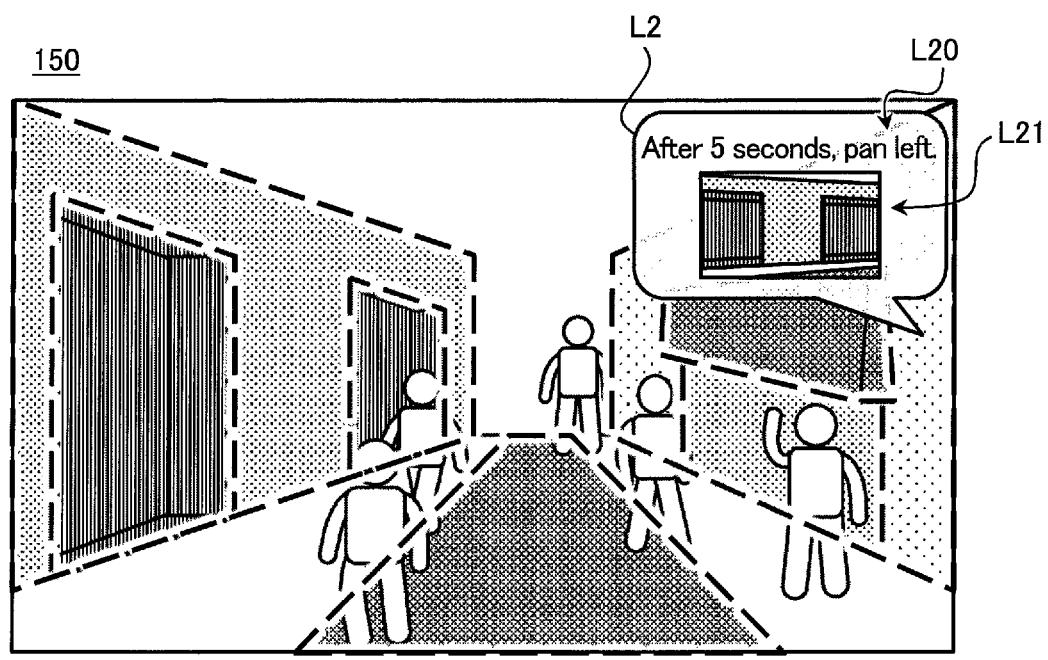
FIG. 10 is a diagram showing a display example of preannouncement information in the digital camera of a second embodiment.

FIG. 10 is a diagram showing a display example of the preannouncement information in the digital camera 100 of the second embodiment. In the example of FIG. 10, the display monitor 150 displays preannouncement information L2 including a preannouncement message L20 and a preannouncement image L21, in addition to the overlay display as in the first embodiment, under the control of the controller 180.

The preannouncement message L20 is a message notifying a change in the shooting state to be caused by future camerawork or the like in the displayed reference moving image M1. In this example, it is notified that panning to a specific direction will occur five seconds after the current time. For example, the preannouncement image L21 is a still image indicating a composition after the camerawork corresponding to the preannouncement message L20 as a thumbnail image. The preannouncement image L21 may be a moving image. The preannouncement information L2 may include only one of the preannouncement message L20 and the preannouncement image L21. The preannouncement information L2 is an example of a second notification in the shooting assist information of the present embodiment.

According to the digital camera 100 of the present embodiment, by displaying the preannouncement information L2 as described above, the shooting person can see the necessity to change the camerawork in the future in order to reproduce the shooting state of the reference moving image, for example. As a result, the shooting person can be easily assisted in reproducing the shooting state of the reference moving image M1, for example.

Figure 11:
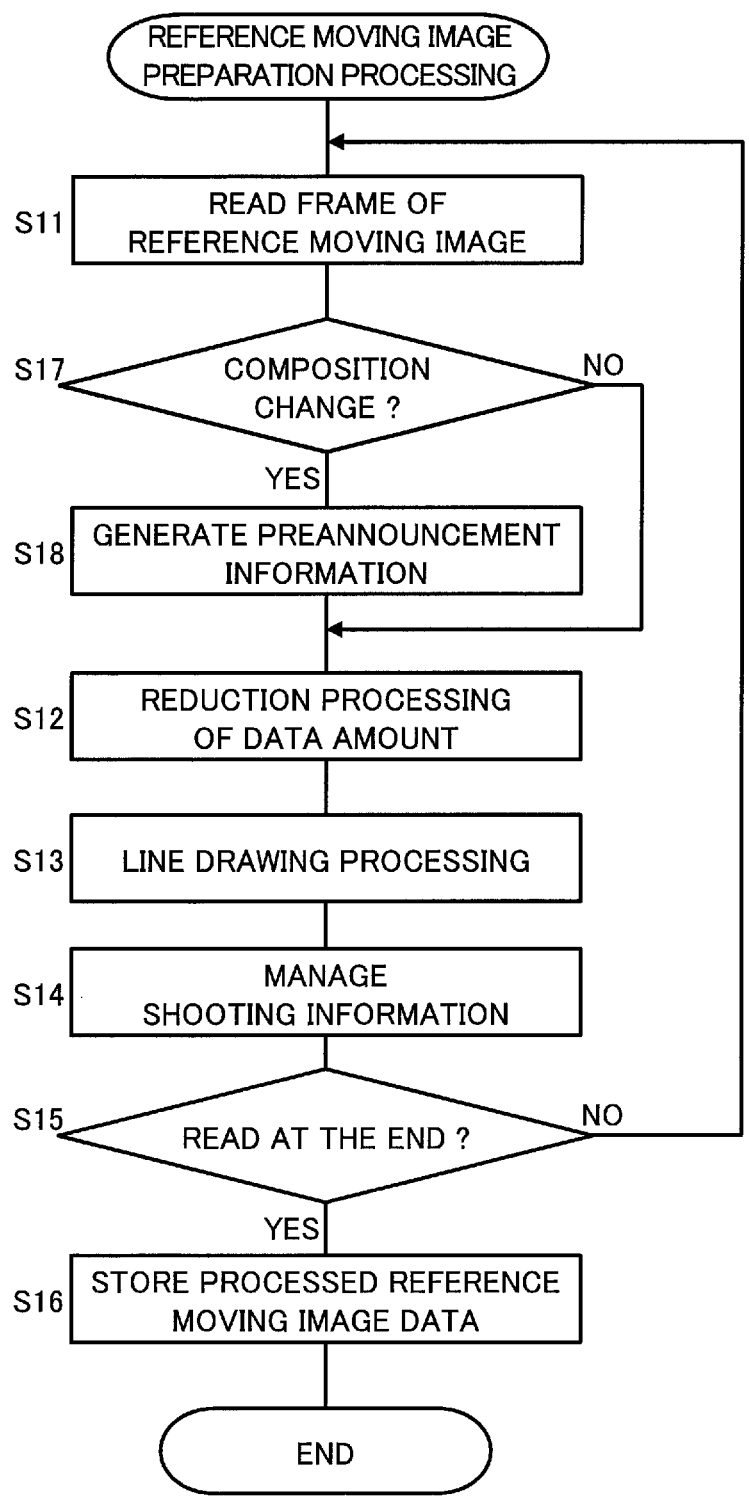
FIG. 11 is a flowchart for explaining reference moving image preparation processing in a digital camera of the second embodiment.

FIG. 11 is a flowchart for describing reference moving image preparation processing in the digital camera 100 of the second embodiment. In the present embodiment, the controller 180 of the digital camera 100 performs processing to prepare the preannouncement information L2 in addition to performing processing of steps S11 to S16 similar to the reference moving image preparation processing of the first embodiment, for example (S17 to S18).

For example, the controller 180 detects a change in the shooting state where the composition changes for each frame image F1 in the reference moving image M1, with reference to the shooting information H1 of the reference moving image M1 (S17). For example, the controller 180 determines whether or not a change in angular velocity is present in the gyro information stored in the shooting information H1, regarding the panning shooting state.

When the change in the composition is detected (YES in S17), the controller 180 generates the preannouncement information L2, according to the detected change in the composition (S18). For example, the controller 180 generates, as the preannouncement image L21, a thumbnail image of the frame image after the change in the composition. For example, the controller 180 manages the preannouncement message L20 of the content related to the detected composition change together with the preannouncement image L21 in association with the timing information indicating timing prior to a predetermined period from the time point of detection. The predetermined period is set to several seconds such as five seconds from the viewpoint of giving a time for the user to prepare at the time of presenting the preannouncement information L2. The controller 180 stores the generated preannouncement information L2 in association with the timing information as appropriate in the processed reference moving image data D10.

Figure 12:
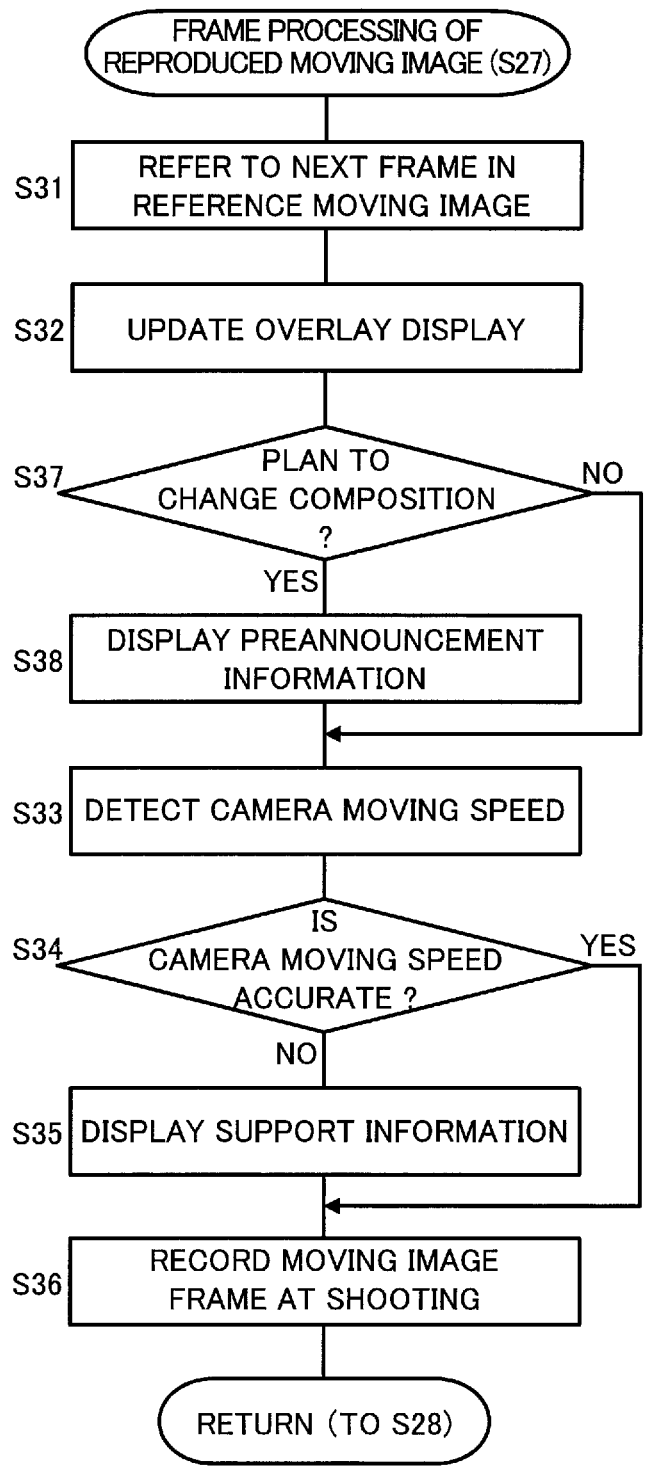
FIG. 12 is a flowchart for explaining frame processing of a reproduced moving image in the digital camera of the second embodiment.

When performing steps S21 to S29 similar to the shooting operation of the reproduced moving image of the first embodiment, the digital camera 100 of the present embodiment performs the processing of FIG. 12 using the preannouncement information L2 prepared as described above, instead of the processing of step S27 of FIG. 8, for example.

FIG. 12 is a flowchart for explaining frame processing of the reproduced moving image in the digital camera 100 of the second embodiment. In the present embodiment, the controller 180 of the digital camera 100 performs processing to present the preannouncement information L2 (S37 and S38), in addition to performing steps S31 to S36 similar to the frame processing (FIG. 8) of the reproduced moving image of the first embodiment.

For example, the controller 180 determines whether or not a plan to change the composition is present in the reference moving image M1 on playback in the overlay display based on the preannouncement information L2 prepared as described above (S37). For example, the controller 180 determines whether or not the preannouncement information L2 associated with the timing information of the displayed frame image F10 is present in the processed reference moving image data D10.

When determining that the plan to change the composition is present in the reference moving image M1 on playback (YES in S37), the controller 180 displays the preannouncement information L2 as shown in FIG. 10, for example (S38). On the other hand, when determining that no plan to change the composition is present in the reference moving image M1 on playback (NO in S38), the controller 180 proceeds to step S33, for example.

As described above, in the digital camera 100 of the present embodiment, the shooting assist information includes the preannouncement information L2 as an example of the second notification showing the announcement that the reference moving image M1 shooting state is to be change after the time point on playback in the reference moving image M1. According to such preannouncement information L2, it is possible to easily reproduce the reference moving image M1 in the reproduced moving image M2 by announcing the change in the shooting state of the reference moving image M1 during the shooting of the reproduced moving image M2.

In the present embodiment, the preannouncement information L2 as an example of the second notification shows the above-described announcement at a time point before a changing time point by a predetermined period, wherein the changing time point is a time point when the shooting state of the reference moving image M1 changes in the shooting assist information. According to this, the user can prepare for a future change in the shooting state at the predetermined period from the time of presenting the preannouncement information L2, and can easily reproduce the reference moving image M1 in the reproduced moving image M2.

In the above description, an example of panning has been described as an example of a target of the preannouncement information L2. The target of the preannouncement information L2 is not particularly limited to panning, and may be a change in various shooting states such as zooming or focusing, for example. The presentation of the preannouncement information L2 is not particularly limited to the change in the composition such as panning, and may be performed for various changes in the shooting state. For example, the detection in step S17 does not necessarily need to use the shooting information H1, and may be performed by image analysis of the reference moving image M1, for example.

In a case where the change in the shooting state is present in the reference moving image M1, the digital camera 100 may selectively perform processing (S33 to S35) for presenting the support information L1 regarding the change in the shooting state. For example, when no change in the shooting state is present in particular (NO in S17), the controller 180 may proceed to step S36 without performing steps S33 to S35 in particular.

In addition, the generation of the preannouncement information L2 is not particularly limited to the stage of the reference moving image preparation processing (FIG. 11). For example, in the shooting operation of the reproduced moving image M2, the controller 180 may generate the preannouncement information L2, referring to the shooting information H10 at a future timing from the frame image at playback in the reference moving image data D10. Alternatively, the reference moving image data D10 may associate the preannouncement information L2 with the timing at which the shooting state of the reference moving image M1 changes, and the controller 180 may refer in advance to the preannouncement information L2 associated with the future timing for a predetermined period from the frame image at playback in step S37.

Third Embodiment

Hereinafter, a third embodiment of the present disclosure will be described with reference to FIGS. 13 to 15B. In the first embodiment, the digital camera 100 has been described as an example of the imaging apparatus that provides the shooting function of the reproduced moving image. In the third embodiment, description of the same configurations and operations as those of the first and second embodiments will be appropriately omitted for another example of such an imaging apparatus.

Figure 13:
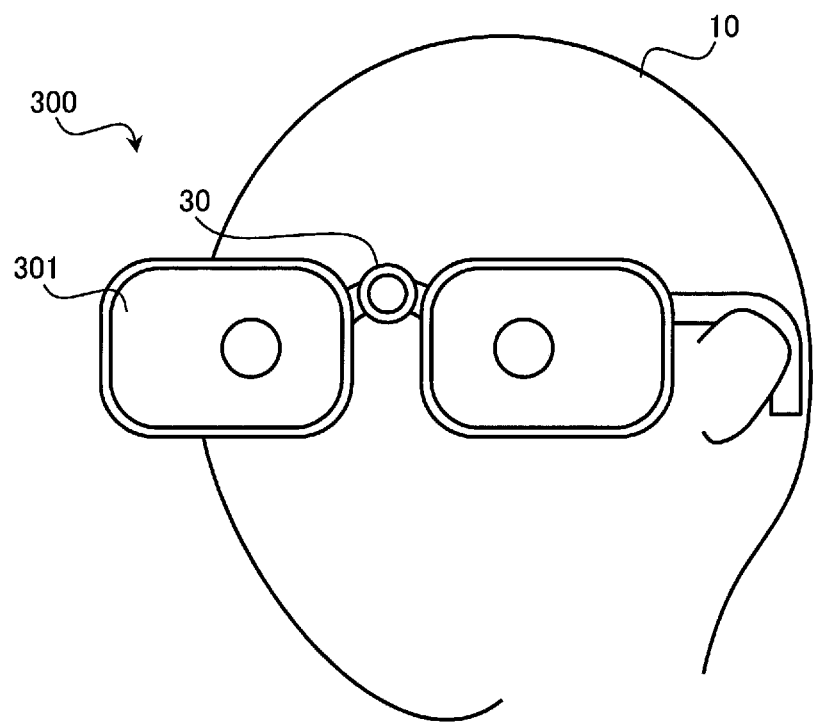
FIG. 13 is a diagram illustrating an appearance of smart glasses according to a third embodiment.

FIG. 13 illustrates an appearance of smart glasses 300 according to the third embodiment. For example, the imaging apparatus of the present embodiment includes smart glasses 300 which are a glasses-type wearable terminal, instead of the digital camera 100 of the first embodiment. For example, as shown in FIG. 13, the smart glasses 300 include light-transmitting members 301 arranged to face the eyes of a wearing user 10. For example, the smart glasses 300 of the present embodiment include a camera unit 30 arranged so as to shoot an image of a scene similar to a scene viewed by the user 10 via the light-transmitting members 301. The number of the camera units 30 in the smart glasses 300 is not particularly limited to one. For example, the smart glasses 300 may be configured to shoot a three-dimensional image by a plurality of camera units 30.

Figure 14:
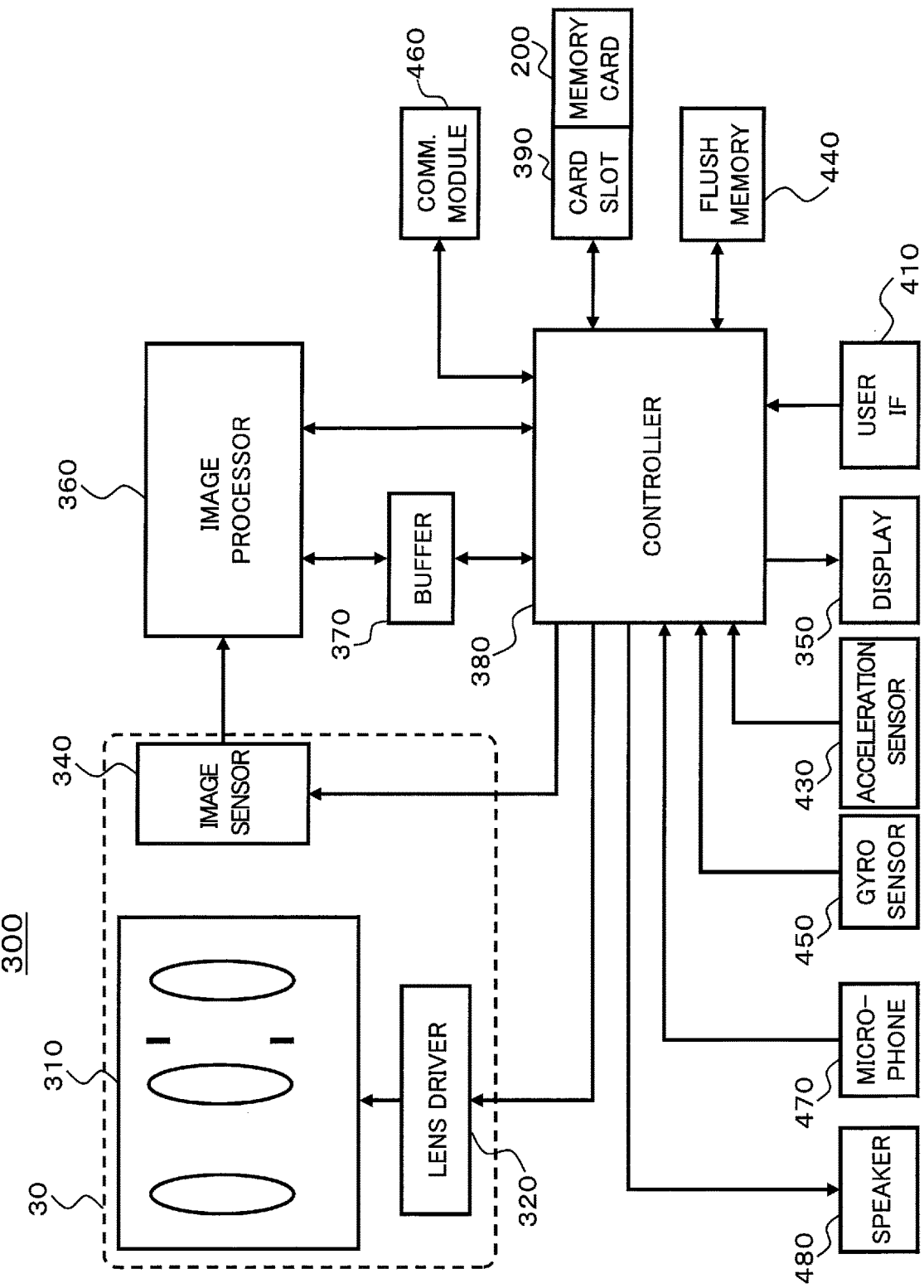
FIG. 14 is a diagram illustrating a configuration of the smart glasses according to the third embodiment.

FIG. 14 illustrates a configuration of the smart glasses 300 according to the present embodiment. For example, the smart glasses 300 of the present embodiment include, in addition to the camera unit 30, an image processor 360, a buffer memory 370, a controller 380, a user interface 410, a display 350, an acceleration sensor 430, a gyro sensor 450, a flash memory 440, a card slot 390, a communication module 460, a microphone 470, and a speaker 480.

For example, in a display method called augmented reality (AR), mixed reality (MR), or the like, the smart glasses 300 cause the display 350 to display a virtual image viewed in the field of view of the wearing user 10 without blocking the field of view. Such smart glasses 300 can be configured by a known display method such as a transmission type display e.g. HoloLens, or a retina projection type display that projects a video on the retina of the user 10 (see, e.g., JP 2022-081342 A).

For example, the display 350 of the smart glasses 300 includes display devices of the above-described various display methods, to generate video light that is light for allowing the user 10 to view a virtual image. Hereinafter, an example of a transmission type display will be described in which video light from the display 350 is guided to the eyes of the user 10 via the light-transmitting members 301 each including an optical element such as a half mirror, and the user 10 views a virtual image so as to be superimposed on an actual scene. The user 10 can recognize the video by viewing the virtual screen ahead of the mirror.

For example, the camera unit 30 of the smart glasses 300 includes an optical system 310, a lens driver 320, and an image sensor 340 configured similarly to the components 110, 120, and 140 of the digital camera 100 of the first embodiment. The other components 360 to 480 in the smart glasses 300 are configured similarly to the corresponding components 160 to 280 in the digital camera 100.

Figure 15A:
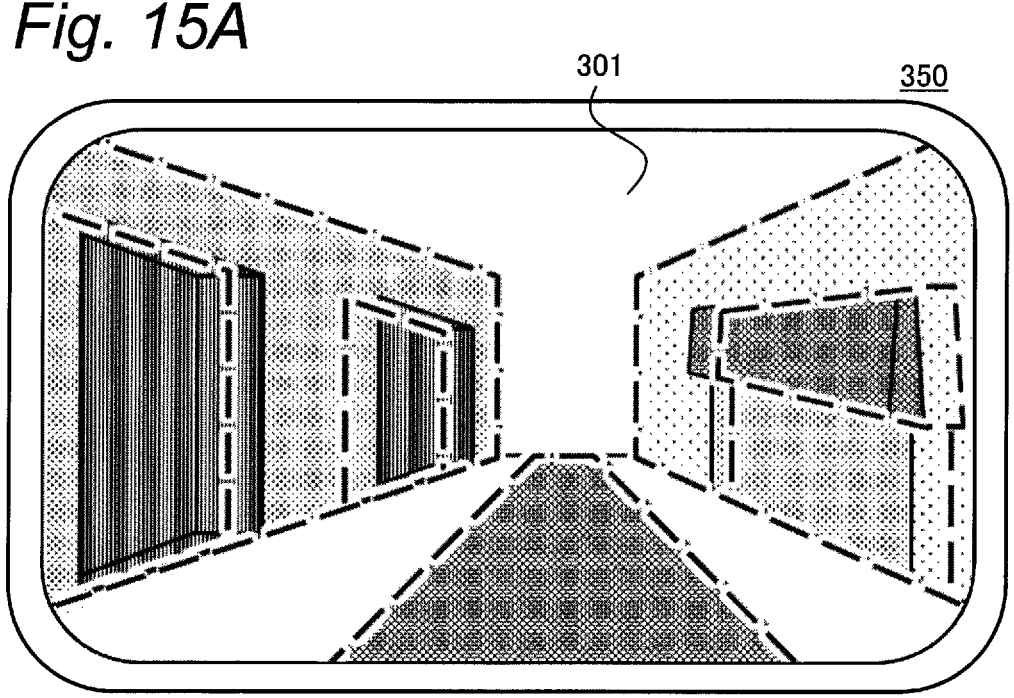
FIGS. 15A and 15B are diagrams for explaining an operation of the smart glasses according to the third embodiment.
Figure 15B:
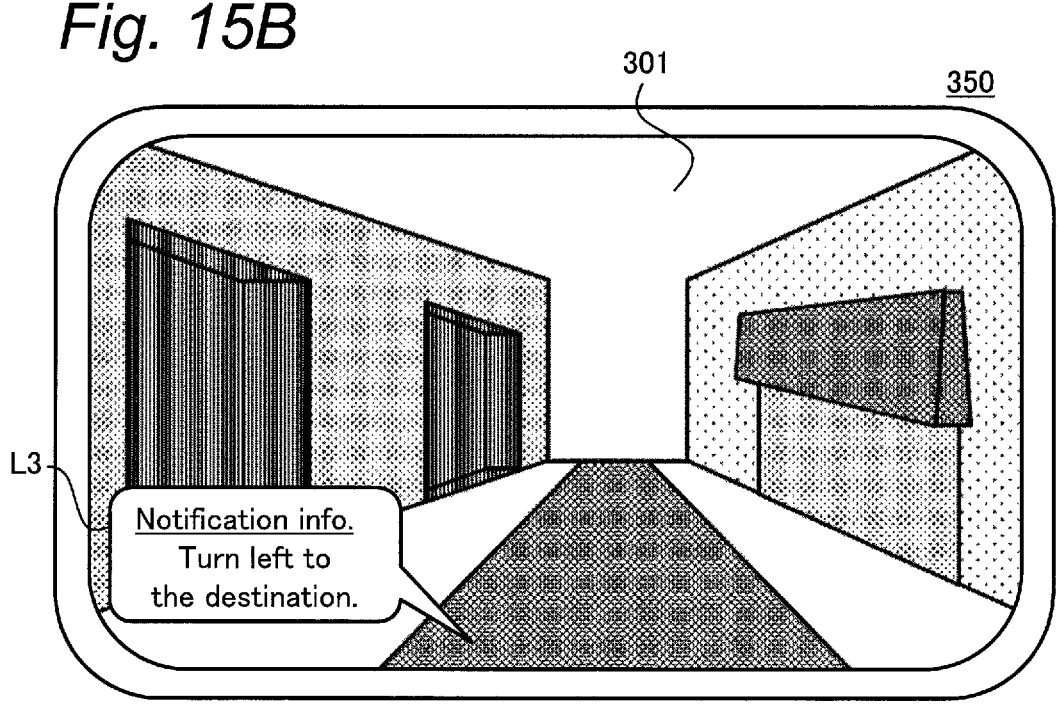

FIGS. 15A and 15B are diagrams for explaining an operation example of the smart glasses 300 of the present embodiment. FIGS. 15A and 15B illustrate various display examples in the smart glasses 300 when a moving image of route guidance toward a preset destination or the like is shot as a reproduced moving image.

For example, when the user 10 wearing the smart glasses 300 of the present embodiment shoots a reproduced moving image similarly to the digital camera 100 of the first and second embodiments as a shooting person, the smart glasses 300 cause the user 10 to view various shooting assist information via the light-transmitting members 301 in the display 350. For example, similarly to the first and second embodiments, the smart glasses 300 of the present embodiment prepare the reference moving image data and then perform the shooting operation of the reproduced moving image. In this case, the smart glasses 300 can omit the live view display (S21) and the like in the operation similar to the flowchart of FIG. 6.

For example, as shown in FIG. 15A, the smart glasses 300 cause the display 350 to display a line diagram image of the reference moving image via the light-transmitting members 301. As a result, the user 10 of the smart glasses 300 can easily improve the accuracy of the reproduced moving image by moving his/her field of view so as to match the line diagram with the actual shooting scene viewed via the light-transmitting members 301. Such display of the reference moving image is not limited to the line diagram, and may be watermark display, for example.

In the example of FIG. 15B, the smart glasses 300 of the present embodiment display notification information L3 for guiding to a destination via the light-transmitting members 301 of the display 350. For example, the smart glasses 300 of the present embodiment can present the notification information L3 as described above by performing an operation similar to the operation of generating preannouncement information on the change in the shooting state in the digital camera 100 of the second embodiment. Thus, it is possible to perform various shooting assists such as guiding the user 10 to go to the destination without getting lost.

As described above, the smart glasses 300 of the present embodiment can easily shoot the reproduced moving image by presenting various shooting assist information to the user 10 wearing the smart glasses 300. The smart glasses 300 may superimpose to display a live view image under shooting as a line diagram image in addition to the line diagram image of the reference moving image. For example, the superimposition display may be performed with different colors or line types of the respective line diagram images. According to this, the user 10 can improve the reproducibility of the reproduced moving image by performing an action so that the two line diagram images coincide with each other, and can easily shoot the reproduced moving image.

The imaging apparatus of the present embodiment is not limited to the smart glasses 300 as described above, and may be a smart contact lens that is a contact lens-type wearable terminal, for example. The output interface of the present embodiment may cause the user 10 to view various displays so as to be superimposed on the scene through the light-transmitting member 301 arranged between the user 10 and the scene in the above-described various wearable terminal or the like.

As described above, in the imaging apparatus such as the smart glasses 300 of the present embodiment, the display 350, which is an example of the output interface, outputs the shooting assist information so that the shooting assist information is superimposed on the scene and viewed by the user 10 through the light-transmitting member 301 in which the scene of the second moving image on shooting is viewed by the user 10. According to this, the shooting assist information can be presented according to the field of view of the user 10, and the shooting of the reproduced moving image by the user 10 can be finely assisted. For example, in the shooting assist information of the present embodiment, the reference moving image may be played back as a moving image of a line drawing in a state where the past reference moving image and the current scene are superimposed. Note that the smart glasses 300 may cause the user 10 to view the shooting assist information without passing through the light-transmitting member 301. For example, the shooting assist information may be directly projected on the retina of the user 10 by a retina projection type display.

Fourth Embodiment

Hereinafter, a fourth embodiment of the present disclosure will be described with reference to FIGS. 16 to 18. In the first to third embodiments, an example of the imaging apparatus that provides the shooting function of the reproduced moving image has been described. In the fourth embodiment, description of the same configurations and operations as those of the first to third embodiments will be appropriately omitted for an example of a system that provides such a function.

Figure 16:
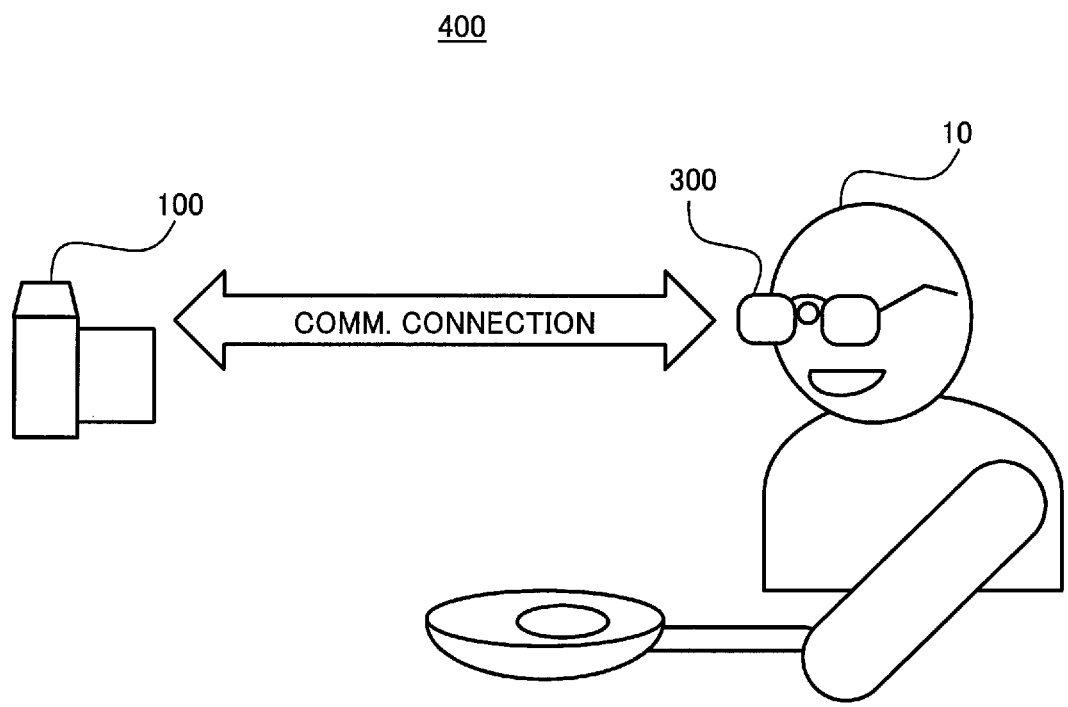
FIG. 16 is a diagram illustrating a video production system according to a fourth embodiment.

FIG. 16 illustrates a video production system 400 according to the present embodiment. For example, as shown in FIG. 16, the present system 400 includes the digital camera 100 and the smart glasses 300, to provide a shooting function of a reproduced moving image. For example, when the digital camera 100 shoots the reproduced moving image, the present system 400 presents information for assisting the user 10 wearing the smart glasses 300 to act as a subject of the reproduced moving image. The present system 400 is an example of an information presentation system in the present embodiment.

In the present system 400, the digital camera 100 and the smart glasses 300 are connected via the respective communication modules 260 and 460 to communicate data by near field communication, for example. In the present system 400, the digital camera 100 may be operated by a shooting person different from the user 10, or may be fixedly arranged. The smart glasses 300 in the present system 400 are an example of an information presentation device in the present embodiment. The smart glasses 300 of the present system 400 may not particularly include the camera unit 30.

The present system 400 may further include a personal computer (PC) that is communicably connected to the digital camera 100 or the like for shooting control or video editing, for example. The digital camera 100 or the like in the present system 400 may be connected to a communication network such as the Internet to transmit moving image data or the like of a shooting result to an external information terminal. Not limited to the digital camera 100, the smart glasses 300 may be connected to the communication network to transmit data.

The present system 400 can be applied to an application of shooting a moving image in which a scenario is determined in advance in live commerce, for example. For example, a moving image in which a person who is a role model of such a reproduced moving image acts according to the scenario is shot in advance as a reference moving image, and reference moving image data is prepared similarly to the first embodiment and the like. Using such reference moving image data, the present system 400 can appropriately perform the same operation of shooting a reproduced moving image as in the above embodiments.

For example, prior to actually performing live streaming, the user 10 may practice his/her behavior with reference to the reference moving image. Therefore, in such a case, the present system 400 displays the superimposed image of the reference moving image and the live view image similarly to the above embodiments. As a result, the user 10 can easily practice for reproducing the reference moving image. The superimposed image may be displayed on the digital camera 100 or the smart glasses 300, or may be displayed on another display device.

For example, in the video production system 400 of the present embodiment, during live streaming moving image shooting, the shooting assist information including various instructions for causing the user 10 to act according to the scenario is presented from the smart glasses 300 worn by the user 10. Such an operation of the present system 400 will be described with reference to FIGS. 17 and 18. FIG. 17 is a sequence diagram illustrating the operation of the present system 400.

First, for example, when starting shooting a moving image, the controller 180 of the digital camera 100 outputs a notification to that effect to the smart glasses 300 (S41). Upon receiving the notification from the digital camera 100, the controller 380 of the smart glasses 300 causes the display 350 to display information indicating start of shooting (S42). In addition, the present system 400 sequentially transmits, via the communication network, the moving image data started to be shot in step S41 by the digital camera 100, for example.

Next, for example, the controller 180 of the digital camera 100 generates instruction information for instructing an action according to the scenario, referring to a list prepared in advance in the reference moving image data, and outputs the instruction information to the smart glasses 300 via the communication module 460 (S43). FIG. 18 illustrates such an instruction list D15 in step S43.

For example, as shown in FIG. 18, the instruction list D15 records "Action" to be instructed and "Instruction Content" indicating the instruction information regarding the action in association with each other in the order of "Reference Time" that is the time in the reference moving image. The instruction list D15 can be prepared based on the reference moving image, similarly to the preannouncement information of the second embodiment, for example.

For example, based on the instruction list D15 as described above, the controller 180 of the digital camera 100 outputs instruction information regarding one action to the smart glasses 300 in the order of the earliest of the reference time (S43). Upon receiving the instruction information from the digital camera 100, the controller 380 of the smart glasses 300 causes the display 350 to display the received instruction information (S44). For example, in step S44, as the first instruction content in the instruction list D15 of FIG. 18, a memo of the feature of the product is displayed on the smart glasses 300 in order for the user 10 to describe the product.

Next, for example, the controller 180 of the digital camera 100 detects whether or not an action corresponding to the output instruction information has been performed by the user 10 based on image data sequentially captured by the image sensor 140, for example (S45). For example, information indicating a determination criterion such as an image feature value for detecting each "Action" recorded in advance in the instruction list D15 is stored in association with the instruction list D15, and then the controller 180 performs image recognition or the like according to the determination criterion in step S45. The processing in step S45 is not limited to image recognition, and may be voice recognition such as keyword extraction.

When detecting that the corresponding action is not performed by the user 10 (NO in S45), the controller 180 performs the detection in step S45 again, based on image data after a predetermined cycle such as a frame cycle. Thus, until the user 10 performs the action, the present system 400 waits without outputting the instruction information of the next action. In this time, the display of the instruction information may be continued, or may be notified again or emphasized.

When detecting that the action corresponding to the output instruction information has been performed by the user 10 (YES in S45), the present system 400 performs processing similar to steps S43 to S45 for the next action in the scenario of the reference moving image (S46 to S48). Such determination in step S45 is "YES" when the user 10 completes the action, for example.

For example, referring to the instruction list D15, the controller 180 of the digital camera 100 generates instruction information regarding the next action, to output the instruction information to the smart glasses 300 similarly to step S43 (S46). Upon newly receiving the instruction information, the controller 380 of the smart glasses 300 updates the display, according to the new instruction information (S47). Thus, the present system 400 presents the next instruction information to the user 10 at an appropriate timing after the user 10 executes the action in the order of the earliest in the instruction list D15.

The controller 180 detects execution of a newly instructed action by the user 10 similarly to step S45 (S48), to control whether or not to output subsequent instruction information. Thereafter, the present system 400 repeats processing similar to the above for each "Action" included in the instruction list D15. Thus, after the instruction information is sequentially output, the shooting of the reproduced moving image in the present system 400 ends.

According to the above processing, the present system 400 displays the next instruction information after the user 10 performs the action in the instruction list D15 one by one (S43 to S48). Thus, the present system 400 can realize information presentation that facilitates behavior according to the scenario of the reference moving image in the reproduced moving image being shot by the user 10.

In the above description, an example has been described in which the controller 180 of the digital camera 100 generates the instruction information and detects the execution of the action of the user 10 (S43, S45, S46, S48), but the present system 400 is not particularly limited thereto. For example, the controller 380 of the smart glasses 300 may perform some or all of the processing of steps S43, S45, S46, and S48. For example, the controller 380 of the smart glasses 300 may receive the reference moving image data, the image data being shot, or the like from the digital camera 100, perform the above processing, and control the display 350 as an output interface.

In addition, the present system 400 may use image data shot by the camera unit 30 of the smart glasses 300. For example, the shot moving image such as live streaming in the present system 400 may include the shooting result of the camera unit 30 of the smart glasses 300 at an appropriate time. As a result, in the above example, the product or the like that is being introduced by the user 10 can be displayed at the eyes of the user 10. Furthermore, the controller 380 of the smart glasses 300 may control moving image shooting by the camera unit 30 in synchronization with moving image shooting by the digital camera 100, or may perform detection in steps S45 and S48, based on the shooting result of the camera unit 30. The reference moving image data in such a case may include a result of shooting an image of a person serving as a model at the time of shooting the reference moving image using the smart glasses 300.

As described above, the video production system 400 in the present embodiment is an example of an information presentation device including the digital camera 100 and the smart glasses 300. The digital camera 100 is an example of an imaging apparatus. The smart glasses 300 are an example of an information presentation device that exemplifies, to the user 10, shooting assist information such as instruction information output from the communication module 260, which is an example of an output interface of the digital camera 100. According to the present system 400, it is possible to perform information presentation that facilitates shooting of a moving image that the user 10 desires to reproduce.

Figure 17:
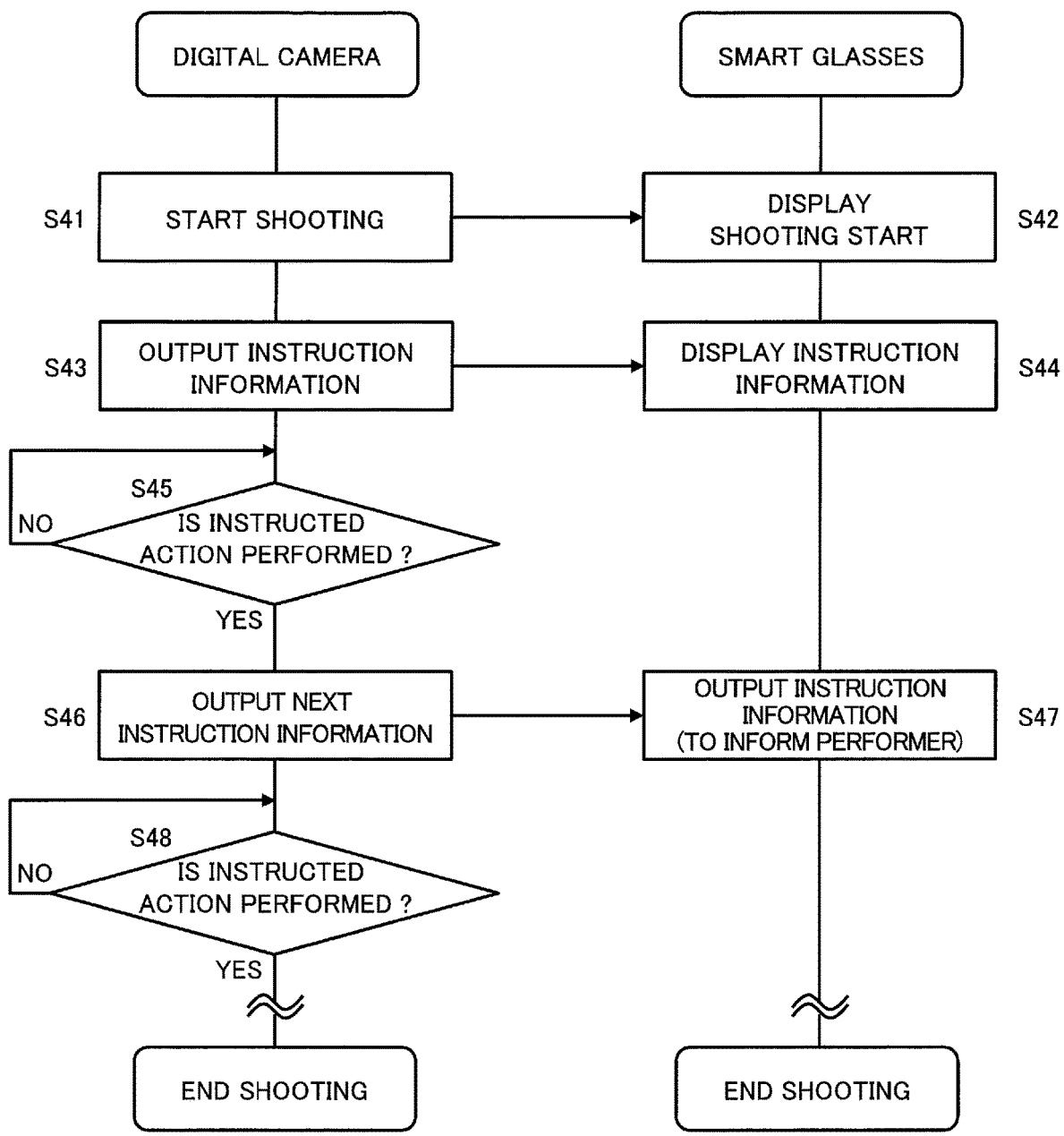
FIG. 17 is a sequence diagram illustrating an operation of the video production system in the fourth embodiment.

In the present embodiment, the controller 180 causes the output interface to output one or more of instructions for causing the user 10 to execute one or more of actions executed in the reference moving image (first moving image) as the shooting assist information in the shooting of the reproduced moving image (second moving image), as in FIG. 17. This can make it easy for the user 10 to shoot a moving image in which an action according to the scenario of the reference moving image is performed.

In the present embodiment, the shooting assist information includes first and second instructions for causing the user to execute first and second actions in turn executed in the first moving image (see FIG. 18). The controller 180 detects whether or not the first action is executed by the user after the first instruction is output from the output interface (S43 to S45). The controller 180 causes the output interface to output the second instruction after the execution of the first action is detected (S45 to S48). Accordingly, it is possible to instruct the user 10 to sequentially perform each action in the scenario of the reference moving image and to easily shoot the reproduced moving image according to the scenario.

In the present embodiment, an information providing device such as the smart glasses 300 that presents information regarding moving image shooting by an imaging apparatus such as the digital camera 100 to the user 10 may be provided. An information providing device includes an output interface (420) that outputs information to a user, and a controller (380) that controls the output interface based on recording data in which information regarding a first moving image is recorded and image data generated by an imaging apparatus. The controller causes the output interface to output shooting assist information for assisting the user so as to match a second moving image with the first moving image in shooting of the second moving image by the imaging apparatus. Even with such an information presentation device, it is possible to easily shoot a moving image in which reproduction of an existing moving image is desired.

Other Embodiments

As described above, the first to fourth embodiments have been described as an example of the technology disclosed in the present application. However, the technique in the present disclosure is not limited thereto, and can also be applied to embodiments in which changes, substitutions, additions, omissions, and the like are made as appropriate. In addition, it is also possible to combine each component described in each of the above-described embodiments to form a new embodiment. Thus, in the following, other embodiments will be exemplified.

In the first to fourth embodiments described above, an example of preparing the processed reference moving image data D10 before performing the shooting operation of the reproduced moving image has been described. In the digital camera 100 of the present embodiment, the processed reference moving image data D10 may not be particularly prepared, and the original reference moving image data D1 may be used at the time of the shooting operation of the reproduced moving image M2. For example, the controller 180 may reduce the moving image size from the original reference moving image data D1 developed in the buffer memory 170, when the shooting function of the reproduced moving image is ON (YES in S22).

In the above embodiments, an example in which the moving image data or the like of the reproduced moving image M2 is recorded in the memory card 200 has been described. The digital camera 100 of the present embodiment is not particularly limited to recording in the memory card 200, and may record moving image data in various recording media such as an SSD, or may distribute moving image data to a communication network such as the Internet via the communication module 260. A system configuration of such a modification is illustrated in FIGS. 19 and 20.

Figure 19:
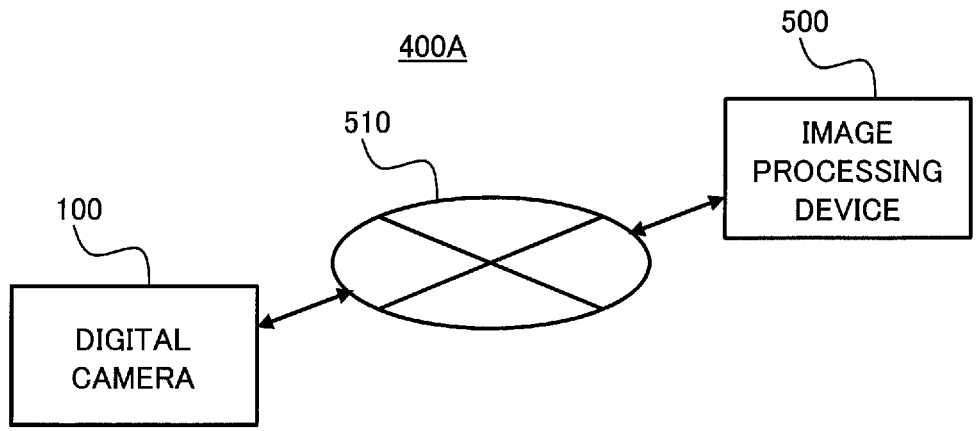
FIG. 19 is a diagram illustrating a system configuration in a first modification.

FIG. 19 illustrates a configuration of an image processing system 400A in a first modification. The present system 400A includes the digital camera 100 and an image processing device 500 such as a cloud server. For example, the digital camera 100 and the image processing device 500 are connected via a communication network 510 to communicate data with each other. In the present system 400A, the reference moving image data may be stored in the image processing device 500 in advance, for example. The digital camera 100 may perform the shooting operation of the reproduced moving image, based on the reference moving image data received from the image processing device 500.

Furthermore, in the present modification, the digital camera 100 may transmit the shot moving image data to the image processing device 500 via the communication network 510. The moving image data may be stored in the storage of the image processing device 500. Such reading/writing of the image data is not limited to moving images, and may be performed on still images. Furthermore, the present system 400A is not particularly limited to the digital camera 100, and may include the smart glasses 300, for example. For example, the smart glasses 300 may be communicably connected to a cloud server or the like to play back the reference moving image or record the image data.

Figure 20:
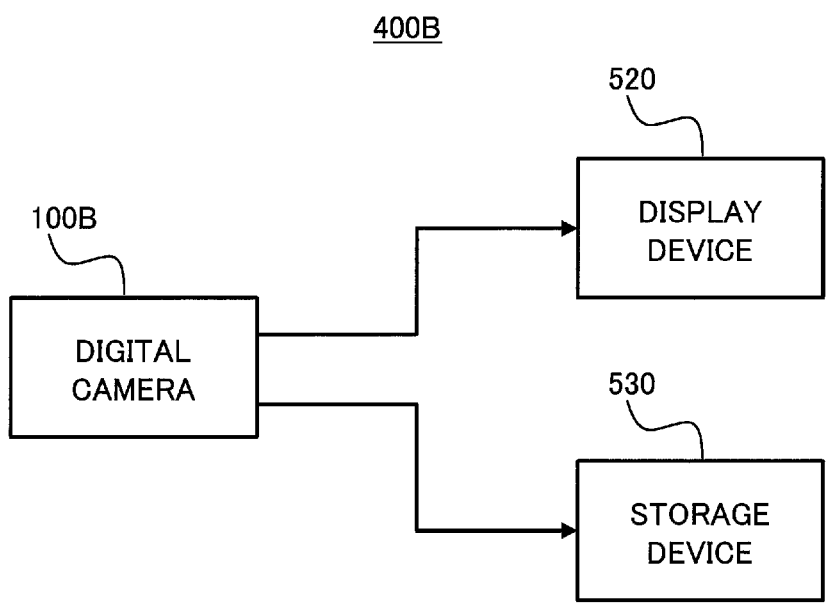
FIG. 20 is a diagram illustrating a system configuration in a second modification.

FIG. 20 illustrates a configuration of a camera system 400B in a second modification. The present system 400B includes a digital camera 100B, and a display device 520 and a storage device 530 externally attached to the digital camera 100B. In the present embodiment, the digital camera 100E may not particularly include the display and the recorder. The digital camera 100B of the present embodiment includes a connecter such as an interface circuit connected to the display device 520 and the storage device 530 to be capable of outputting data. Even with the various systems 400A and 400B as described above, it is possible to provide the shooting function of the reproduced moving image similarly to the above embodiments, and to easily perform the moving image shooting desired by the user.

In the above embodiments, an example in which various shooting assist information is displayed and output has been described. In the present embodiment, the shooting assist information is not limited to the display output, and may be output by sound. For example, the digital camera 100 may output, by sound, various notifications such as the preannouncement message L20 using the speaker 280 as an output interface. Furthermore, the digital camera 100 may be communicably connected to an external speaker, an earphone, or the like so as to output the shooting assist information by sound using the communication module 260 as an output interface.

As described above, in the imaging apparatus of the present embodiment, the output interface may output a sound indicating the shooting assist information. According to this, it is possible to assist the shooting of the reproduced moving image and to facilitate the shooting of the moving image that the user desires to reproduce, similarly to the above embodiments.

Furthermore, in the above embodiments, the example in which the reference moving image M1 on playback is overlaid and displayed on the live view screen in the shooting function of the reproduced moving image in the digital camera 100 has been described. In the digital camera 100 of the present embodiment, the reference moving image M1 on playback may not necessarily be overlaid and displayed at the time of shooting the reproduced moving image. For example, in an application example such as live commerce, even if there is no overlay display, it is possible to easily shoot the desired reproduced moving image M2 by appropriately displaying the preannouncement information L2 or the support information L1. Furthermore, the digital camera 100 may perform overlay display of the reference moving image M1 only at a predetermined timing such as when the support information L1 is displayed or when an instruction is given to the user, for example.

In the above embodiments, an example has been described in which various information for reproducing the reference moving image M1 are presented to a user such as a shooting person of the digital camera 100. In the digital camera 100 of the present embodiment, the above information presentation is not necessarily to the shooting person, and may to a user who is a subject. For example, the digital camera 100 of the present embodiment can assist the user who is a subject in an action of reproducing the reference moving image M1 under playback with checking the live view screen at the time of the shooting operation of the reproduced moving image.

In the above embodiments, the display monitor 150 is exemplified as an example of the display. In the digital camera 100 of the present embodiment, the display is not limited to the display monitor 150, and may be, for example, an electronic view finder (EVF), an output module that outputs a video signal according to the HDMI (registered trademark) standard, or the like.

In the above embodiments, the digital camera 100 including the optical system 110 and the lens driver 120 is illustrated. The imaging apparatus of the present embodiment does not need to include the optical system 110 or the lens driver 120, and may be, for example, an interchangeable lens type camera.

In the above embodiments, a digital camera is described as an example of an imaging apparatus, but the present disclosure is not limited to this. The imaging apparatus of the present disclosure has only to be an electronic apparatus having an image shooting function (e.g., a video camera, a smartphone, a tablet terminal, or the like).

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiment is for illustrating the technique in the present disclosure, various changes, substitutions, additions, omissions, and the like can be made within the scope of the claims or the equivalent thereof.

The present disclosure is applicable to various imaging apparatuses that shoot a moving image and the like.

The invention claimed is:

1. An imaging apparatus comprising:
an image sensor that captures a subject image to generate image data;
an output interface that outputs information to a user; and
a controller that controls the output interface, based on recording data and the image data generated by the image sensor, the recording data recording information on a first moving image that is a video image,
wherein the controller causes the output interface to output shooting assist information during shooting of a second moving image with the image sensor, the second moving image being another video image than the first moving image, the second moving image being a real-time video image and the first moving image having been previously captured and stored, the shooting assist information assisting the user to match the second moving image with the first moving image.

2. The imaging apparatus according to claim 1, wherein the controller causes the output interface to output the shooting assist information to play back the first moving image in the shooting of the second moving image, based on the recording data.

3. The imaging apparatus according to claim 2, wherein the output interface includes at least one of a display or a connecter, the display displaying the second moving image, the connecter connecting the imaging apparatus to the display, and
the shooting assist information displays playback of the first moving image with the first moving image and the second moving image being superimposed with each other.

4. The imaging apparatus according to claim 3, wherein the shooting assist information displays the playback of the first moving image as a moving image of a line drawing to be superimposed on the second moving image.

5. The imaging apparatus according to claim 2, further comprising a detector that detects a shooting state in which the second moving image is shot,
wherein the shooting assist information includes a first notification indicating an instruction to reduce a difference between a first shooting state regarding the first moving image and a second shooting state regarding the second moving image, according to the detected shooting state by the detector on playback of the first moving image.

6. The imaging apparatus according to claim 2, wherein the shooting assist information includes a second notification showing an announcement that a first shooting state regarding the first moving image is to be changed after a time on playback in the first moving image.

7. The imaging apparatus according to claim 6, wherein the second notification shows the notification at a time before a changing time by a predetermined period, the changing time being a time when the first shooting state is changed in the first moving image in the shooting assist information.

8. The imaging apparatus according to claim 2, wherein the controller selects a frame for starting playback display of the first moving image, among a plurality of frames in the first moving image.

9. The imaging apparatus according to claim 1, wherein the controller sets the imaging apparatus to restore a first shooting state regarding the first moving image, to shoot the second moving image.

10. The imaging apparatus according to claim 1, wherein the recording data records the first moving image in association with a shooting state in which the first moving image is shot.

11. The imaging apparatus according to claim 1, wherein the output interface outputs the shooting assist information to be viewed by the user with the shooting assist information being superimposed on a scene where the second moving image is shot.

12. The imaging apparatus according to claim 1, wherein the controller causes the output interface to output, as the shooting assist information, one or more instructions leading the user to perform one or more actions performed in the first moving image in the shooting of the second moving image.

13. The imaging apparatus according to claim 12, wherein
the shooting assist information includes first and second instructions leading the user to perform first and second actions sequentially performed in the first moving image, and
the controller
detects whether or not the first action is performed by the user after the first instruction is output from the output interface, and
causes the output interface to output the second instruction after detecting that the first action is performed.

14. An information presentation system comprising:
the imaging apparatus according to claim 1; and
an information presentation device that presents the shooting assist information output from the output interface of the imaging apparatus to the user.

* * * * *